Sept. 29, 1959   W. RITZERFELD ET AL   2,906,202
ROTARY DUPLICATING MACHINE
Filed March 28, 1957   15 Sheets-Sheet 2
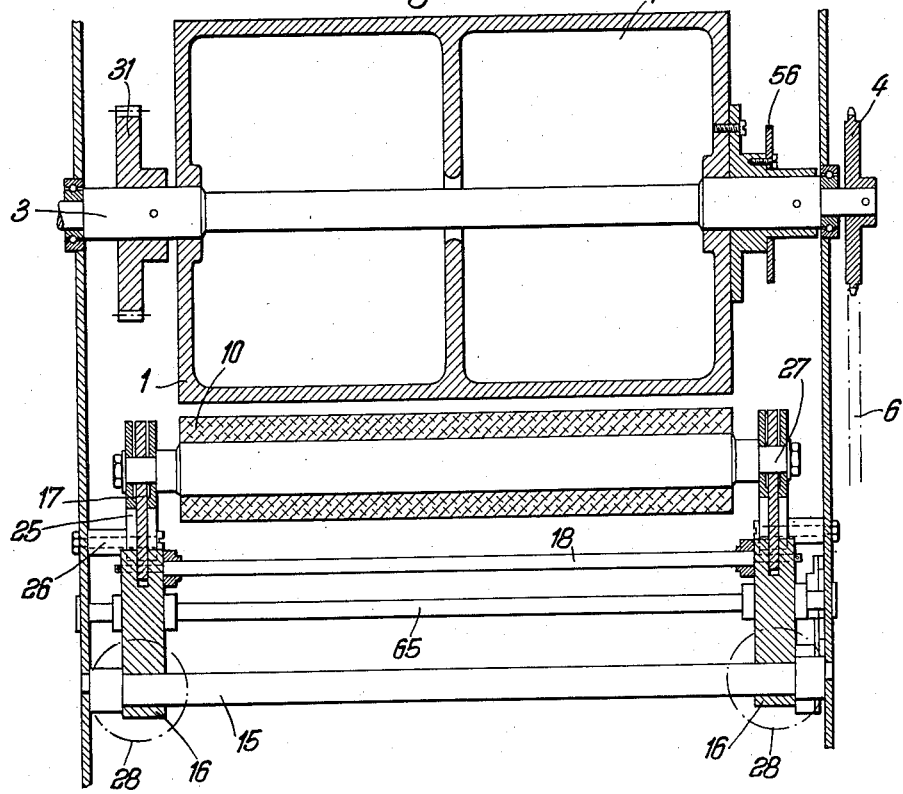
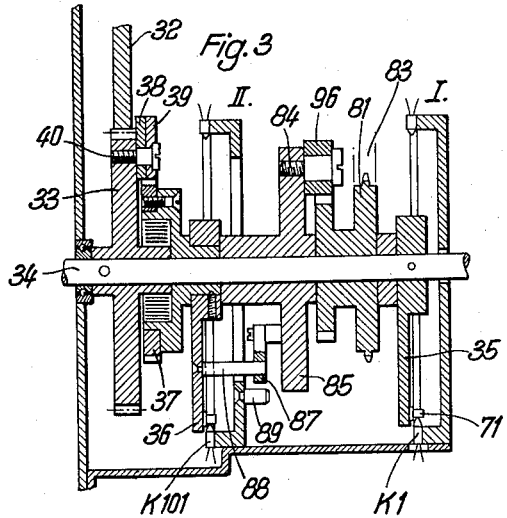
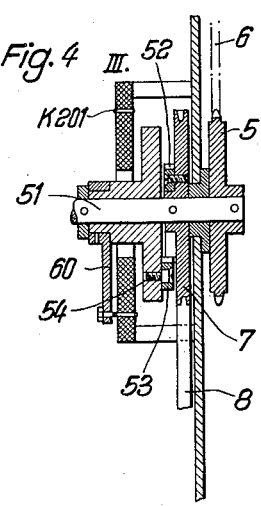
Inventors
Wilhelm Ritzerfeld and
Gerhard Ritzerfeld
by: Michael S. Striker

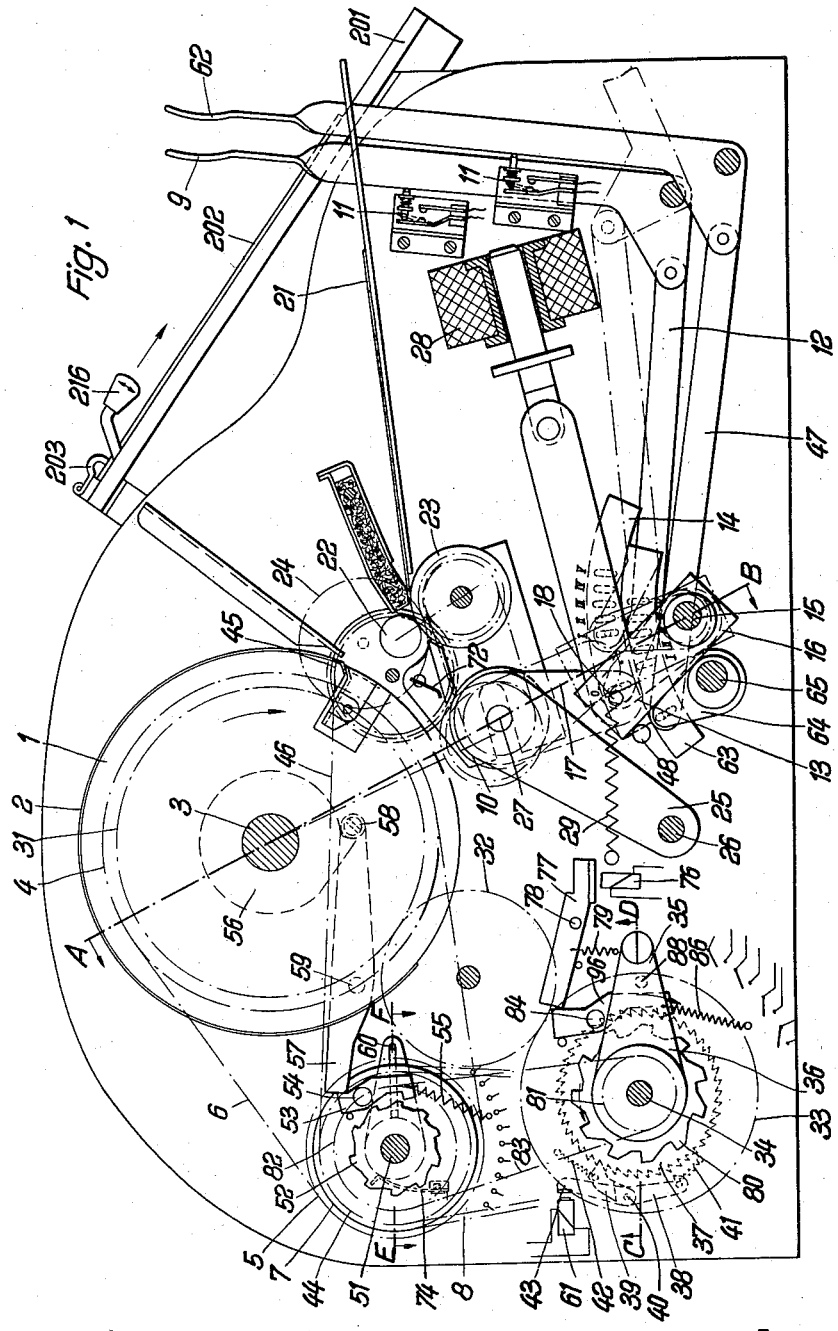

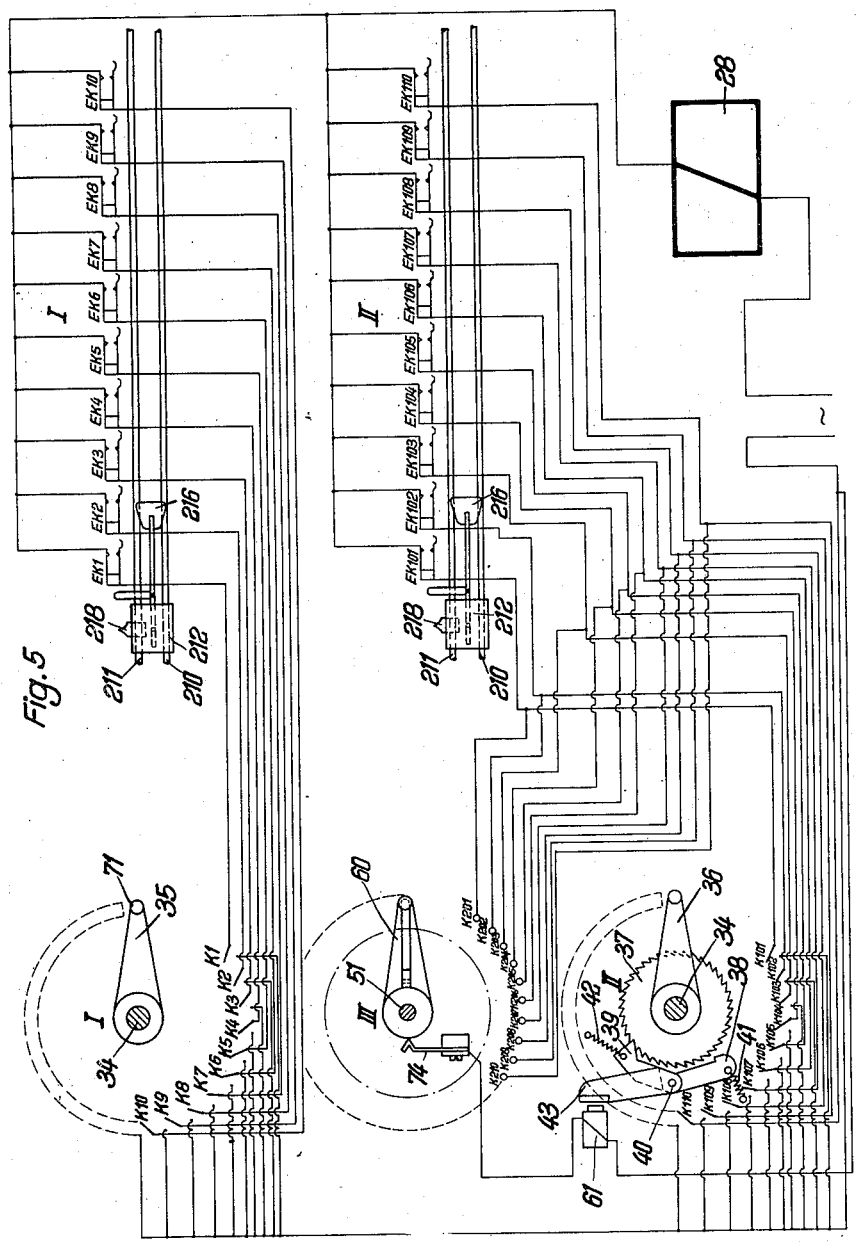

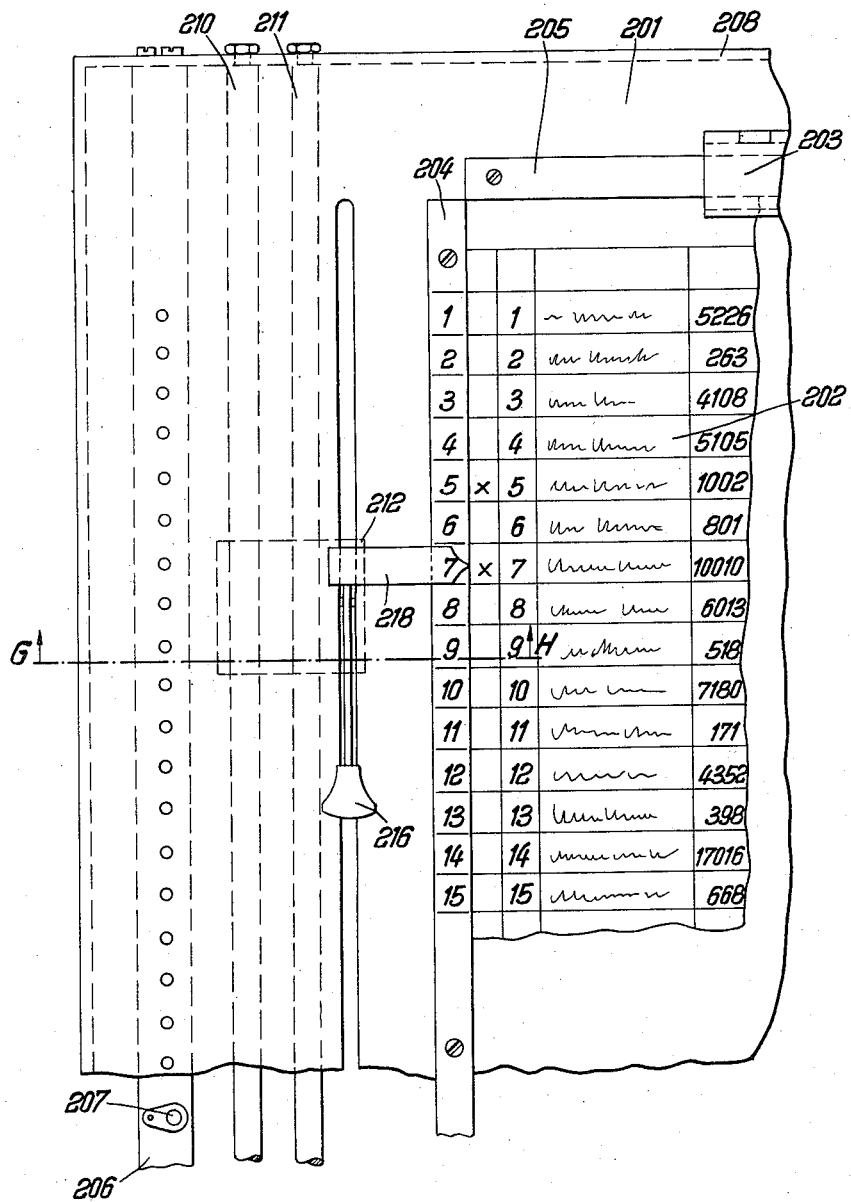

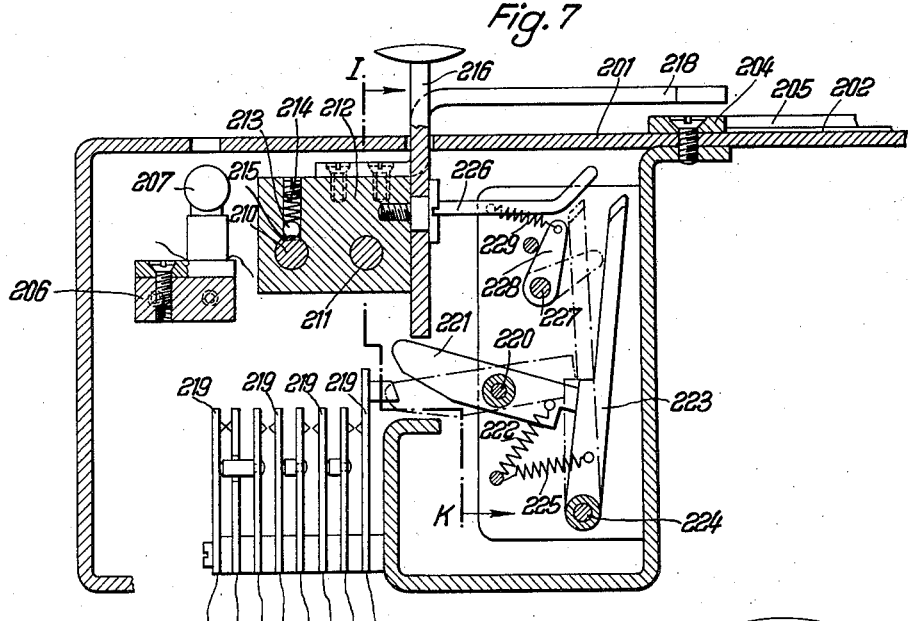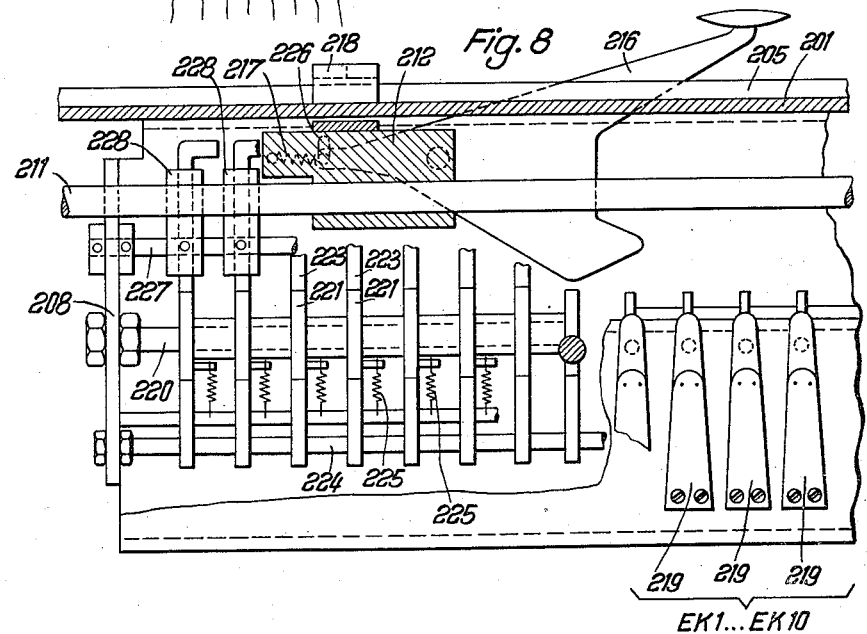

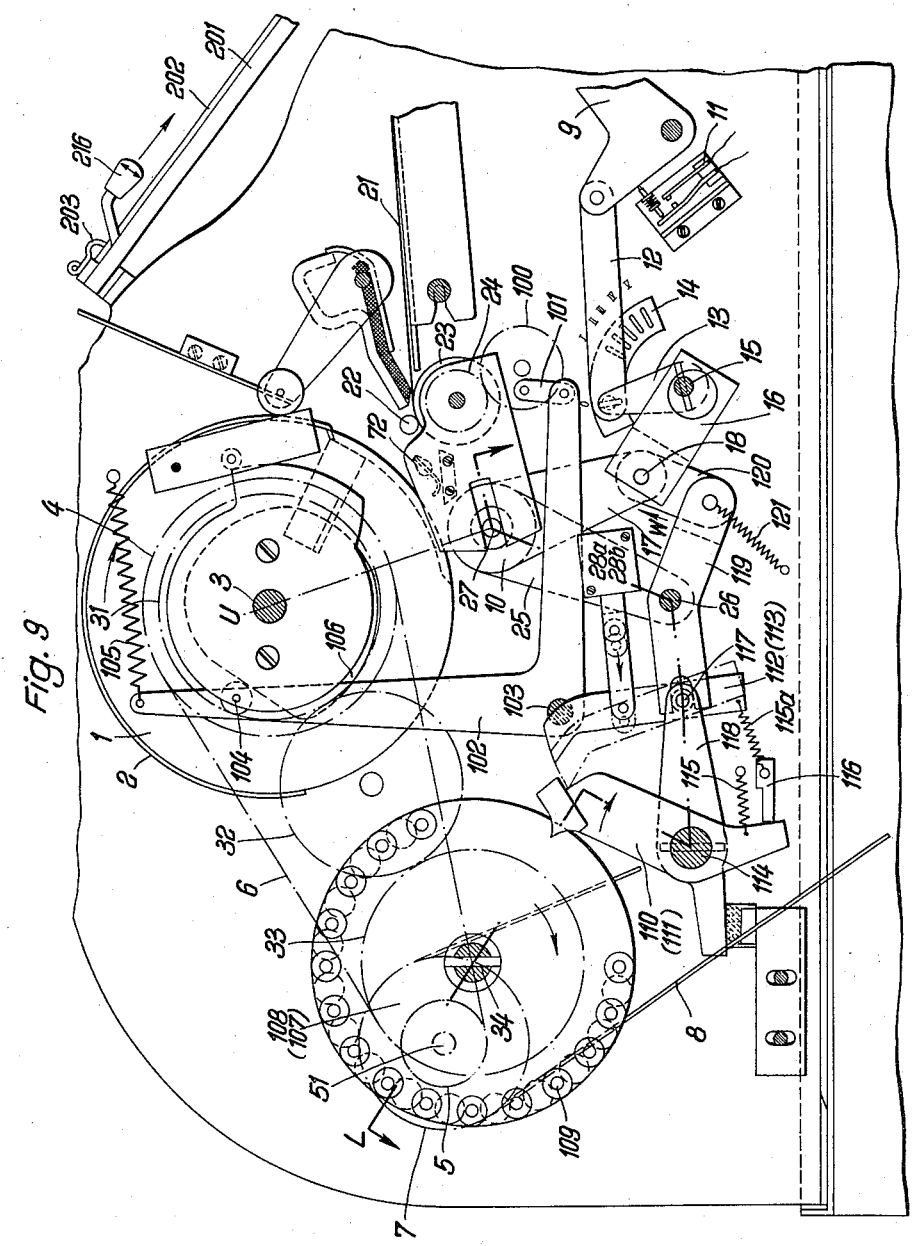

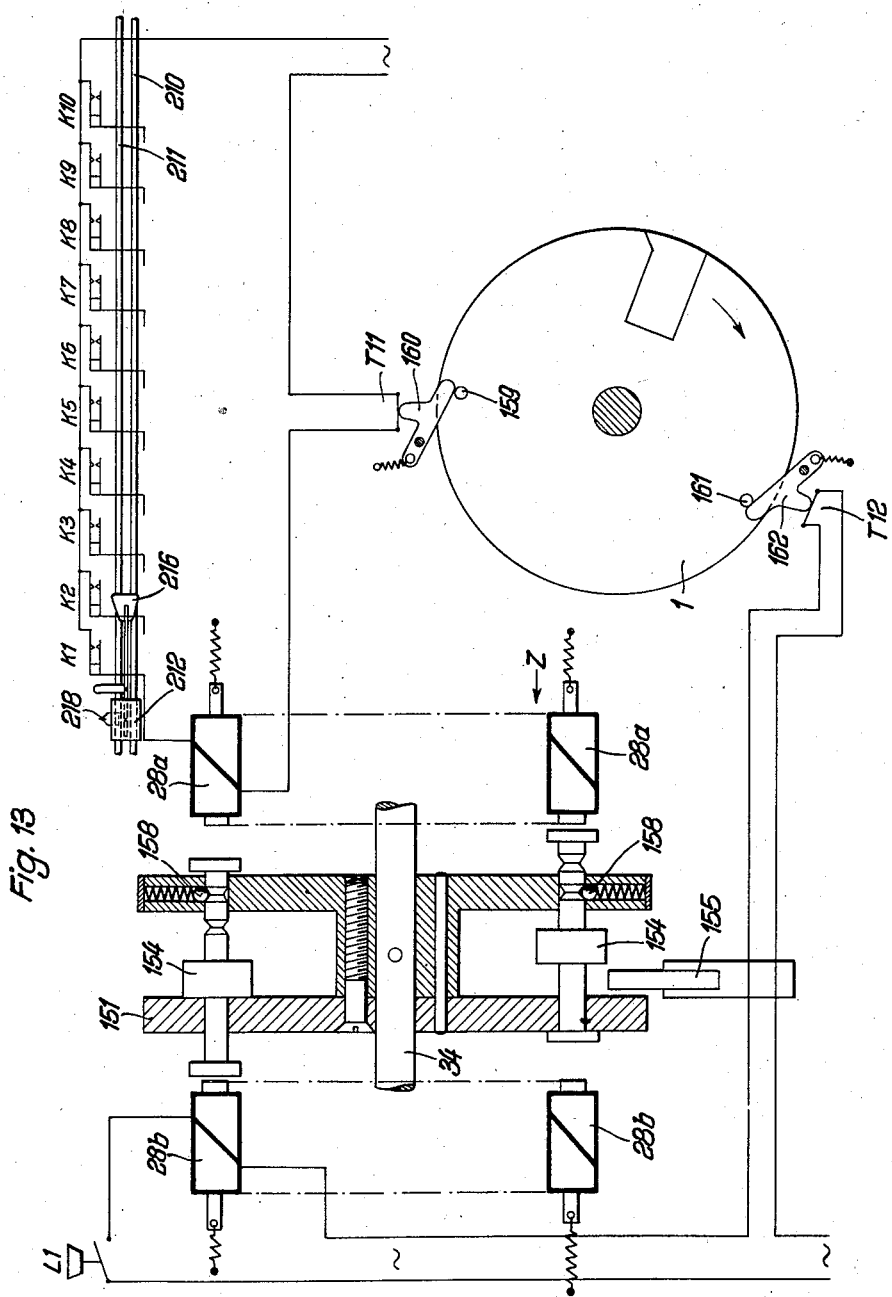

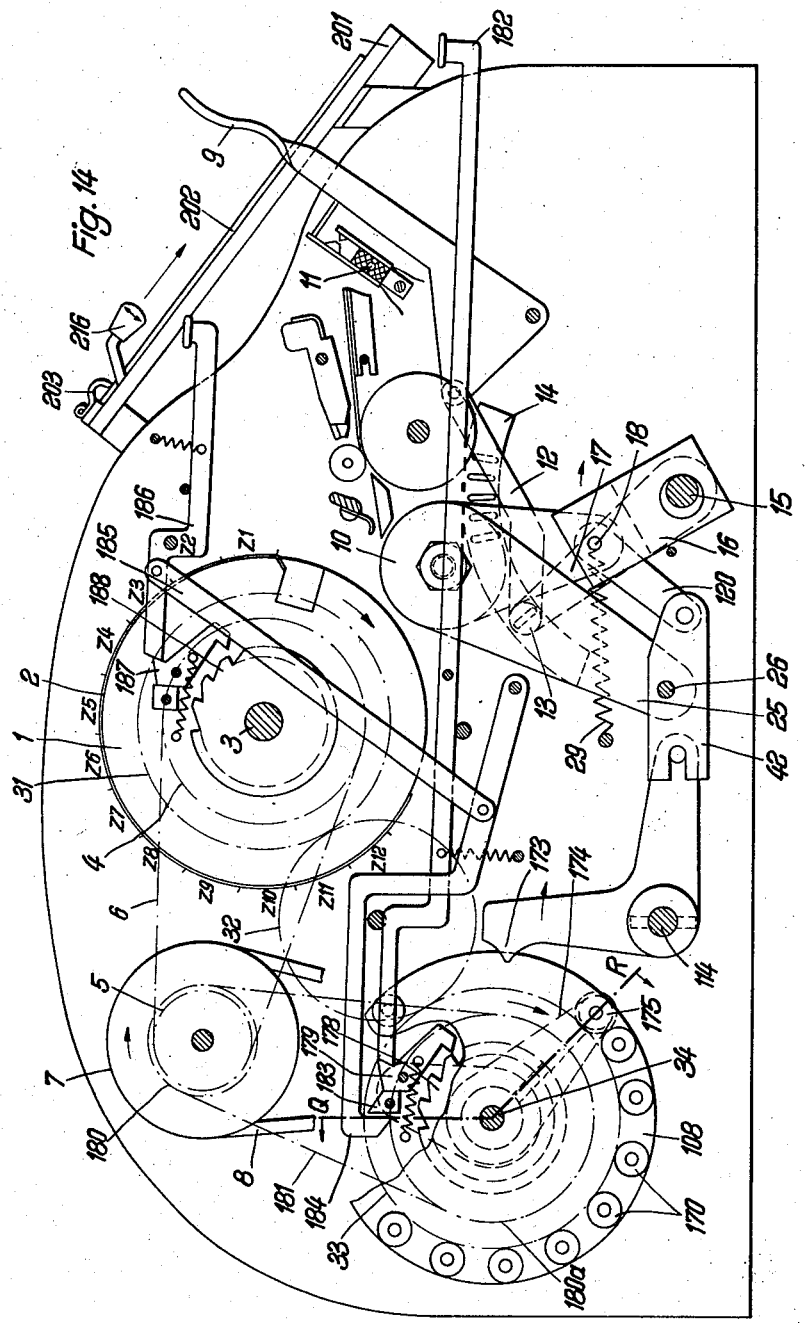

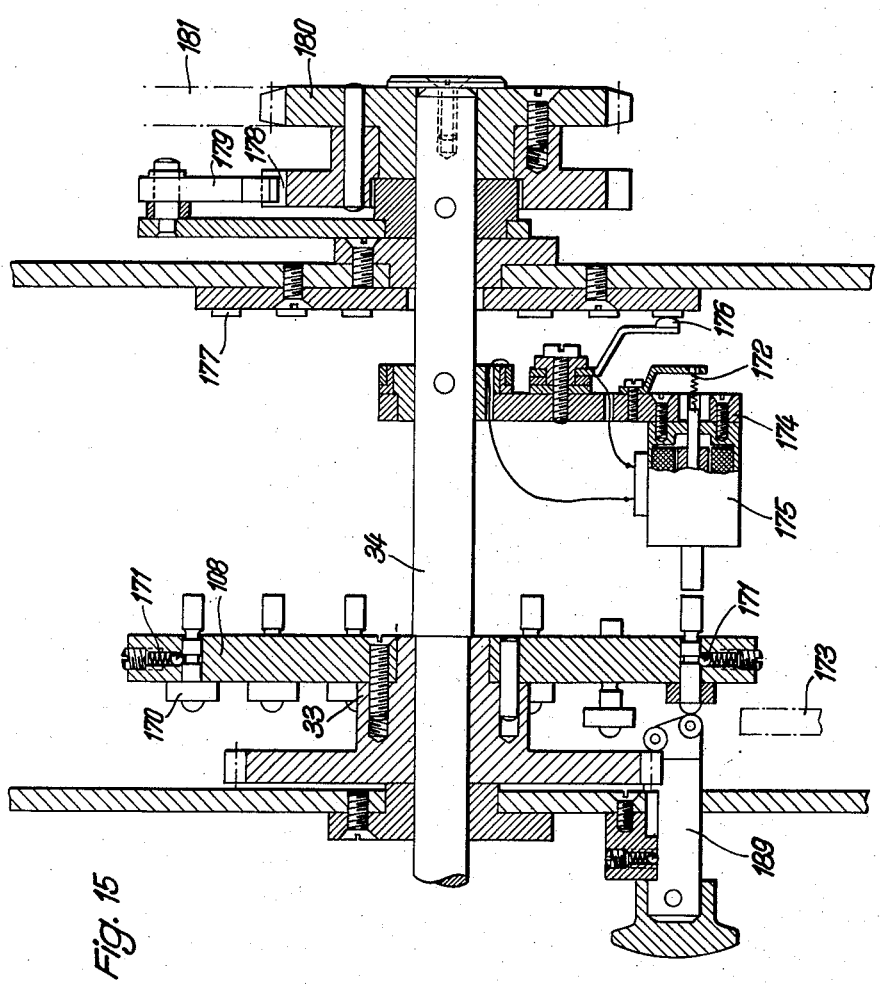

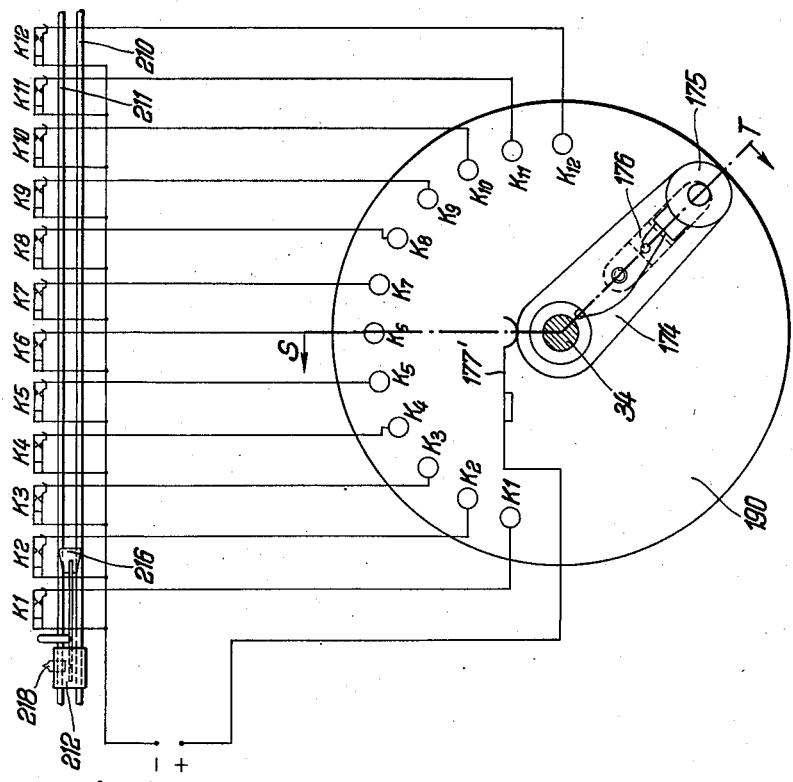
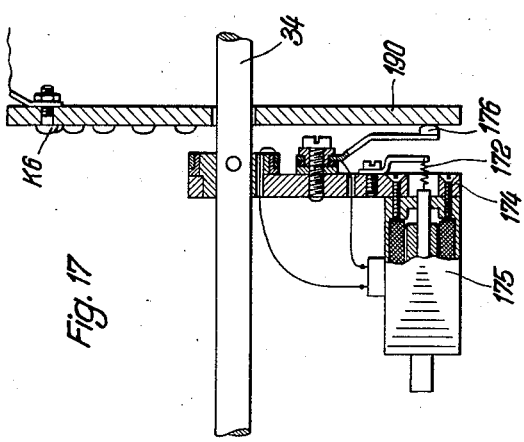

Sept. 29, 1959 W. RITZERFELD ET AL 2,906,202
ROTARY DUPLICATING MACHINE
Filed March 28, 1957 15 Sheets-Sheet 14

Inventors
Wilhelm Ritzerfeld
and Gerhard Ritzerfeld
by: Michael S. Striker
agt.

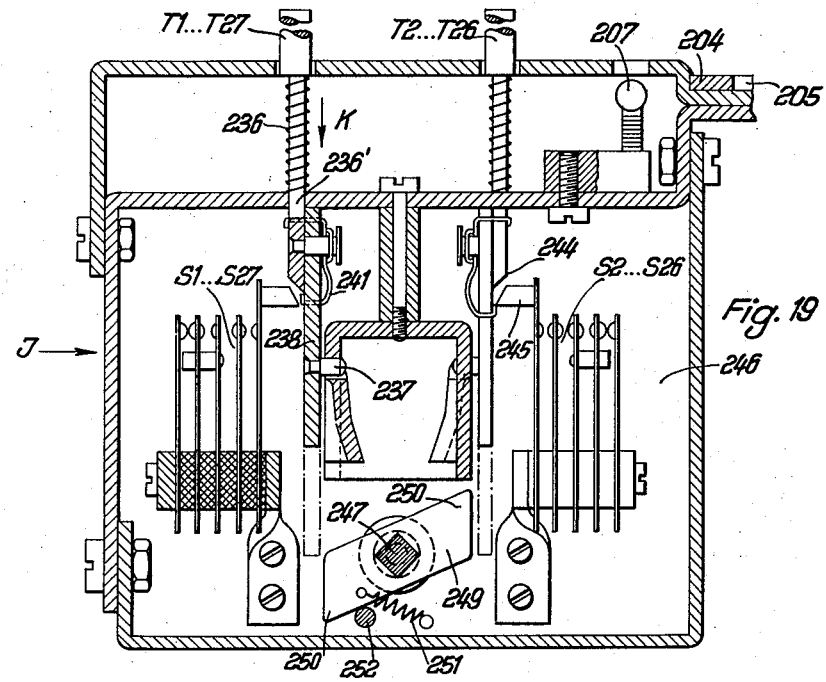
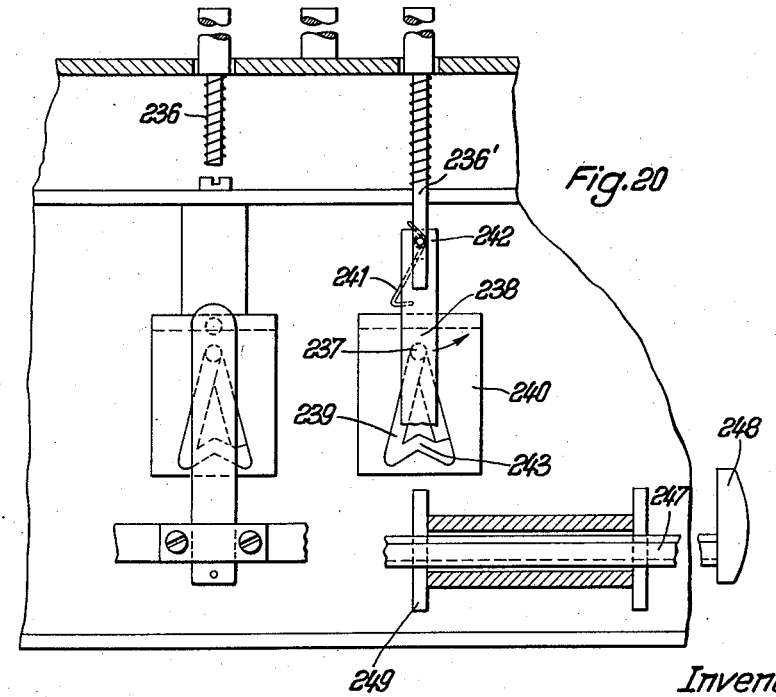

2,906,202
Patented Sept. 29, 1959

2,906,202
ROTARY DUPLICATING MACHINE

Wilhelm Ritzerfeld, Berlin-Dahlem, and Gerhard Ritzerfeld, Berlin-Grunewald, Germany Application March 28, 1957, Serial No. 649,176

Claims priority, application Germany March 29, 1956

34 Claims. (Cl. 101—132.5)

The present invention refers to rotary duplicating machines, and more specifically to those equipped for intermittent selective printing and having a printing roller adapted to carry a printing form and a counter roller movable to and from a printing position.

The present invention is applicable to all types of rotary duplicators, namely those in which mirror reversed printing forms are used for printing on moistened sheets, as well as to those in which the printing form is continuously reinked and in which the printing form may be of the raised type, the stencil type or the lithographic type.

On the other hand, the present invention is applicable to rotary duplicating machines in which the above-mentioned counter roller is moved by electrical means, more specifically by a solenoid or electromagnet which is controlled by suitable switch means.

Frequently the printing form is composed of a series of printing portions that are to be printed selectively which in turn calls for appropriate control means.

It is therefore a main object of the present invention to provide a rotary duplicating machine for selective intermittent printing which has for the actuation of the electric means operating the counter roller, a plurality of switch means each associated with the various printing portions of the printing form so that one control member selectively operating the individual switch means serves for the operation of this machine.

It is another object of the invention to provide a rotary duplicating machine in which the selective control of the machine is facilitated by the fact that the selection is done directly by reference to a copy of the printing form mounted along the control means of the machine so that by setting the control means selectively in reference to the visible printing portions of the printing form these particular selected printing portions are reproduced during the operation of the duplicating machine.

With the above objects in view, a rotary duplicating machine according to the invention and including a printing roller adapted to carry a printing form having a series of printing portions and a counter roller movable to and from a printing position in close proximity to the printing roller, comprises in combination electrical means for moving the counter roller to and from the printing position for printing the printing portions of the printing form; a series of switch means respectively associated with the printing portions and connected to the electrical means for actuating the same, each of the switch means being independently movable to an operative position and effecting in that operative position the printing of the associated printing portion of the printing form by operation of the printing roller; a series of actuating means respectively associated with the switch means and spaced from each other in one direction distances equal to the distances between the respective associated printing portions of the printing form; the machine further includes holding means for holding an indicator sheet having a series of indicating portions spaced from each other same distances as the printing portions of the printing form, said holding means being located adjacent said series of actuating means for holding said indicator sheet in a position in which each indicating portion thereof registers with the actuating means associated with the same portion of the printing form; and finally selector means for selectively actuating the actuating means to operate the respective associated switch means, said selector means including indicator means indicating the selected indicating portion at least while the actuating means associated with the same printing portion as said indicating portion holds the associated switch means in this operative position.

In another aspect of the present invention the machine as set forth includes selector means comprising a series of indicator buttons respectively associated with the actuating means and controlling the same, said indicator buttons being spaced from each other in said one direction distances equal to the distances between the respective indicating portions associated with the same printing portions, and being respectively located adjacent said indicating portions, each of said indicator buttons being movable to an operative position for actuating the associated actuating means and switch means.

In still another aspect of the present invention, the rotary duplicating machine as set forth includes selector means comprising an indicator means and being movable between a plurality of positions in which said indicator means indicates selected indicating portions, said selector means cooperating in each of said positions with one of said actuating means for operating the associated switch means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a lateral view of a rotary duplicating machine, the left side wall being omitted for the sake of clarity, this machine being suitable for reproduction of full pages, of portions thereof and of individual lines by means of electromagnetically controlled pressure elements;

Fig. 2 is a partly sectional view taken along line A—B through the printing roller 1 and the counter roller 10 of Fig. 1;

Figure 10:
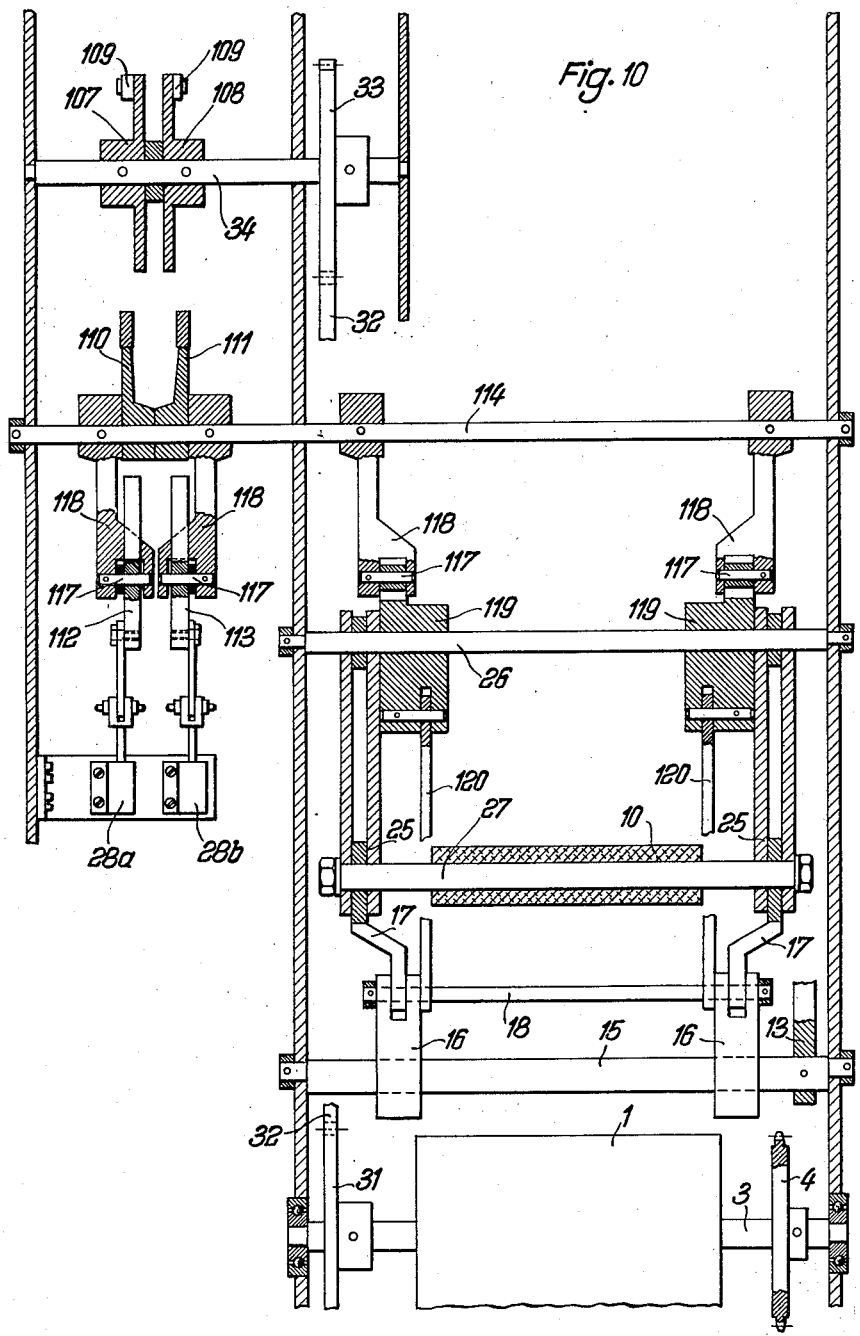
Figure 11:
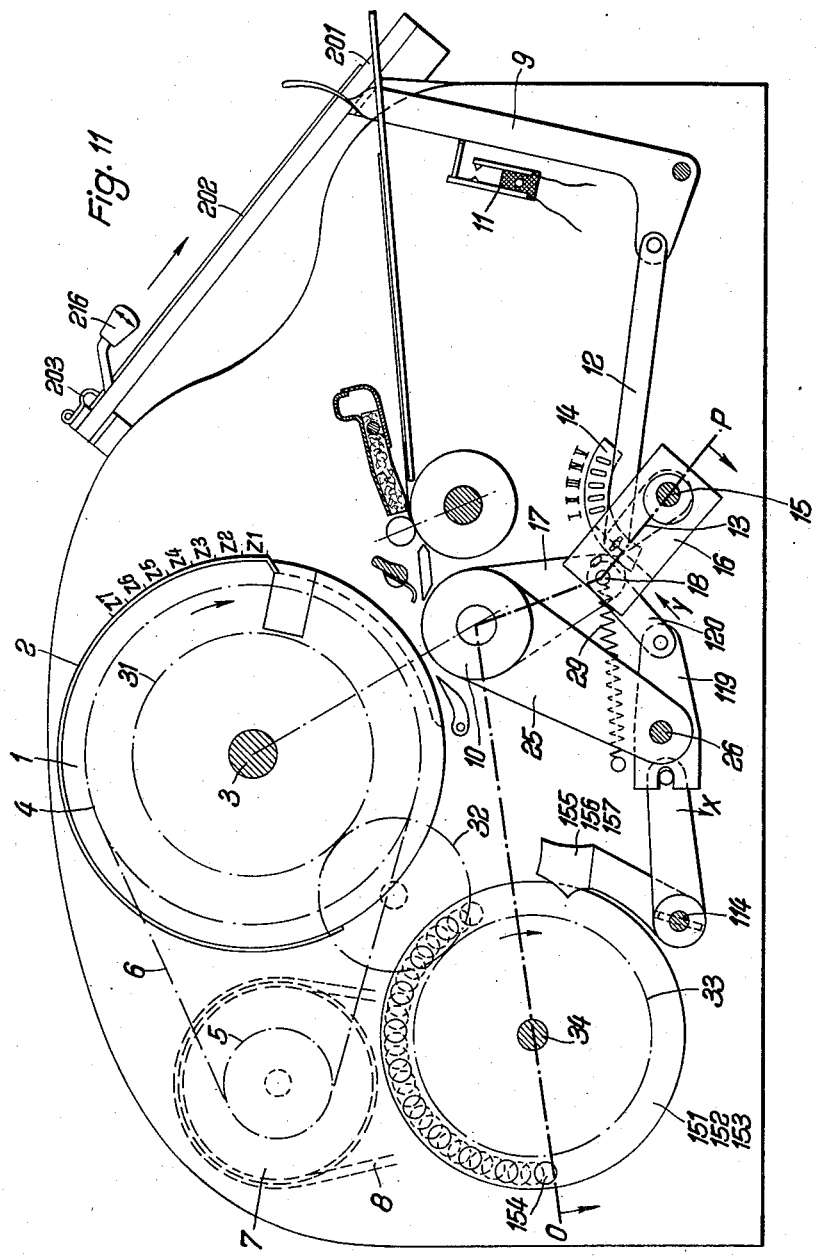
Figure 12:
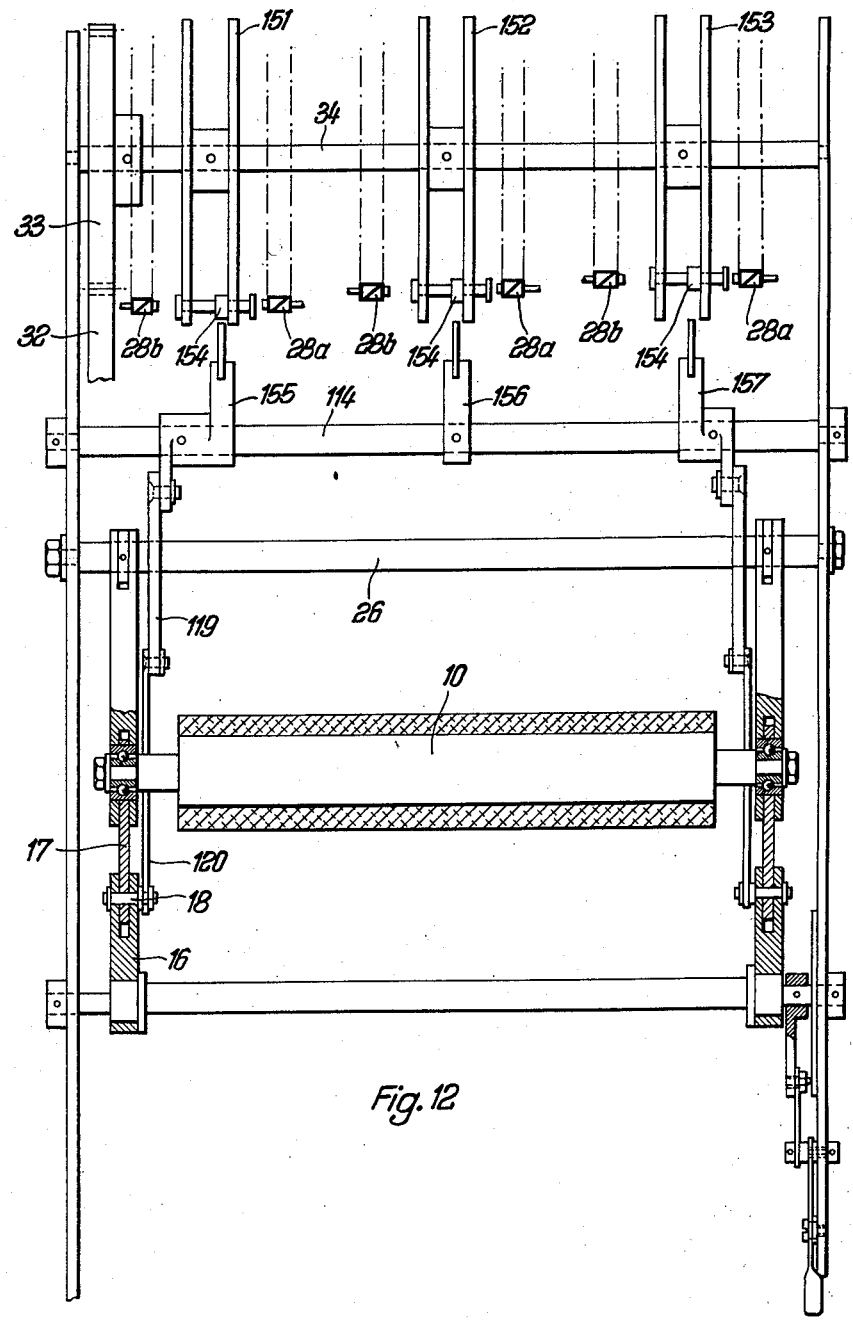
Figure 18:
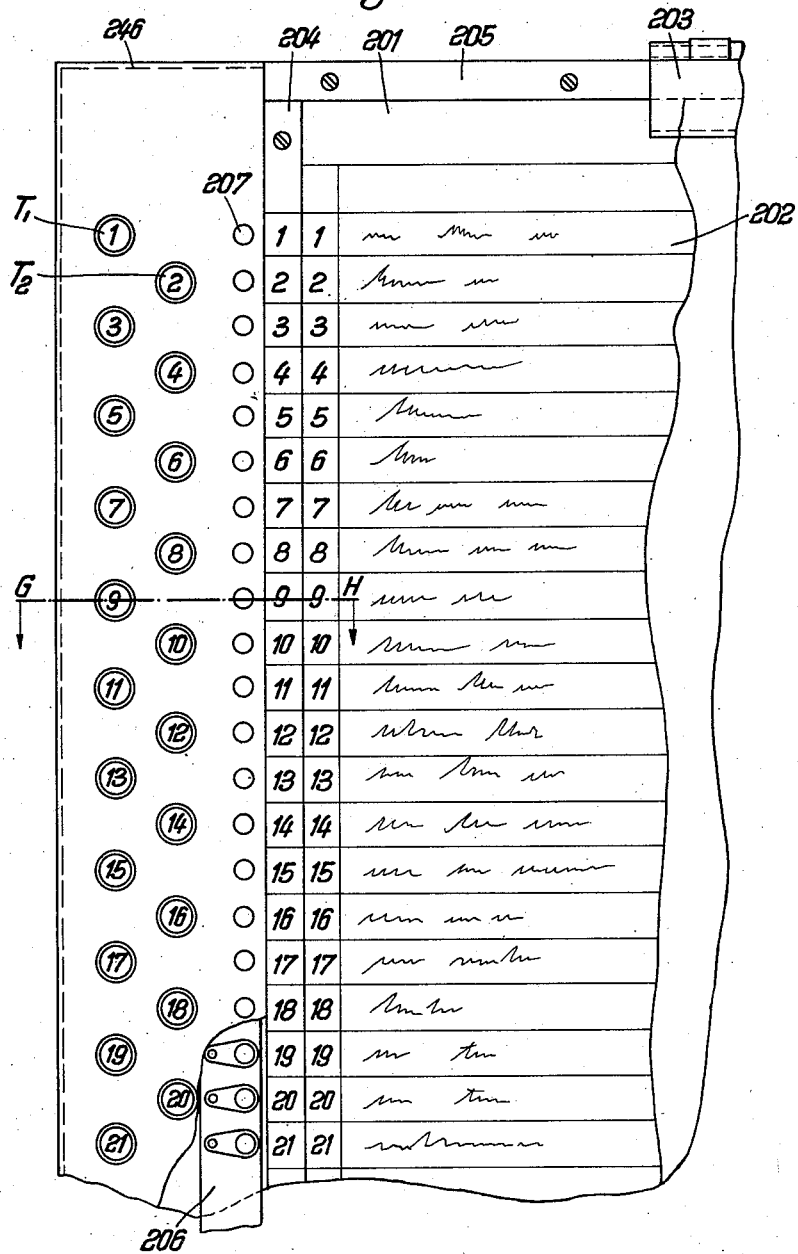

Fig. 3 is a partly sectional fragmentary view taken along line C—D through the control shaft 34 with a solid and movable contact arm 35 and 36 and other parts of the control arrangement;

Fig. 4 is a fragmentary sectional view taken along line E—F through the continuously rotating intermediate drive 51 for the printing roller 1 together with other parts of the control arrangement;

Fig. 5 is mainly a wiring diagram showing diagrammatically the electric connections and diagrammatically some of the mechanical control devices forming part of the machine;

Fig. 6 is a partial top view of the selector and indicator means forming part of the device;

Fig. 7 is a fragmentary sectional view taken along line G—H through the selector device and indicator means according to Fig. 6;

Fig. 8 is a similar fragmentary sectional view taken along line I—K through the selector device according to Fig. 7;

Fig. 9 is a lateral view of another rotary duplicating machine, the left side wall being omitted for the sake of clarity, the machine being equipped with electromagnetically operated actuating means for the counter roller;

Fig. 10 is a fragmentary sectional view taken along line L—M of Fig. 9 for illustrating the actuating means for the counter roller;

Fig. 11 is a side view of still another rotary duplicating machine, the left hand side wall being omitted for the sake of clarity, and illustrates the device with the electromagnetically controlled actuating means for the counter roller;

Fig. 12 is a fragmentary sectional view taken along line O—P of Fig. 11;

Fig. 13 is mainly an electric wiring diagram showing diagrammatically also the control means for the electromagnets used in this device;

Fig. 14 is a lateral view of still another rotary duplicating machine, the left hand side wall being omitted for the sake of clarity, and again illustrates the electromagnetically controlled actuating means for the counter roller;

Fig. 15 is a fragmentary sectional view taken along line Q—R of Fig. 14;

Fig. 16 is mainly an electrical wiring diagram including a diagrammatical illustration of some of the control elements;

Fig. 17 is a fragmentary sectional view taken along line S—T of Fig. 16;

Fig. 18 is a fragmentary top view of another embodiment of the selector and indicator means according to this invention;

Fig. 19 is a fragmentary sectional view taken along line T—H of Fig. 18; and

Fig. 20 is a partial view seen in the direction of arrow J in Fig. 19.

In all the illustrations of the various embodiments of the invention, a printing roller 1 is shown supported by an axle 3 for rotation in the frame of the machine and carrying a printing form 2. The roller 1 is driven from a motor, not shown, through chain sprockets 4 and 5, a drive chain 6, a pulley 7 and a belt 8.

The drive motor and the whole electrical equipment of the machine is switched on by the main switch 11 when the main control lever 9 is operated. This main lever 9 serves also for adjusting the pressure between the movable counter roller 10 and the printing roller 1. This is done by the action of the link 12 attached to the lever 9 and connected to the control lever 13 which is turned along an arcuate notch member 14 so that the lever 13 will be held in predetermined positions by engagement of projections of the lever with notches in the member 14. In turning the lever 13 turns an eccentric pivot 15' around a stationary pivot 15 whereby toggle levers 16, 17 respectively connected by a pin 18 are affected. Since the counter roll 10 is supported by an axle 27 in turn supported in a support lever 25 swinging around pivot 26, and since one of the toggle levers 17 is also attached to the axle 27, the desired amount of pressure exerted by the counter roller 10 on the printing roller 1 is adjusted and predetermined depending upon which of the positions marked O, I . . . V the control lever 13 assumes with respect to the arcuate member 14.

In all the embodiments illustrated, the printing device is provided also with a panel 201 on which a copy of the printing form may be attached and held by locating the copy within a holding device 205. Since this copy contains all the portions and lines of the printing form it will serve for the purpose of selecting during the operation of the device those sections or lines of the printing form that are intended to be reproduced in the particular case.

On the panel 201 according to Figs. 6–8, an indicator sheet 202 is attached by means of a clamping device 203. This indicator sheet may be a carbon copy or other copy of the printing form 2. The sheet 202 is pushed against the left side and upper locating strips 204, 205, respectively. When the sheet 202 is correctly positioned then each line or portion of the sheet representing the printing form is associated and in register with a number on the strip 204 and also with a corresponding signal light 207. Attached to the panel 201 are two vertical end walls 208 (Fig. 8) and 209 (not shown). In these two opposite end walls the two guide bars 210 and 211 are supported. A slidingly movable control member 212 is arranged for moving along the guide bars 210 and 211 and has a tendency to stop in selected positions determined by the engagement of a small ball 213 under the action of a pressure spring 214 with corresponding notches 215 in the guide bar 210. A main control lever 216 is turnably supported in the control element 212 and is held in a normal position by a spring 217. In addition, the movable control element 212 is provided with indicator means consisting in this example in a pointer 218 made of transparent material. This pointer or indicator 218 extends in lateral direction towards the sheet 202 or the side bar 204.

When a selection is to be made regarding those portions of the printing form intended to be reproduced, then the control member 212 is moved by pulling the control lever 216 until the pointer or indicator 218 registers with the particular portion of the sheet 202 which represents the selected printing portion of the printing form 2. Then by pressure of the hand the control lever 216 is moved downwardly whereby the contact set 219 associated with the selected line or portion is moved into operative position and locked in this position. At the same time the associated signal lamp 207 is switched on to indicate to the operator which particular printing portion has been selected, and by closing or operating the other contact 219 of the selected set other circuits for the operation of the machine are prepared.

It is to be understood that every line or printing portion of the sheet 202 is associated with one set of contacts 219, with one signal lamp 207, and with a set of actuating members for operating the contacts 219, as is shown in Fig. 8. It can be seen also that in this embodiment of the invention the spacing between consecutive sets of contacts 219 and their corresponding actuating means is equal to the spacing between the consecutive printing portions of the sheet 202 which corresponds in turn to the printing form 2.

A set of contacts 219 is moved into operative position and simultaneously locked in position when the lower end of the control lever 216 is moved in downward direction and abuts against one of the levers 221 so as to move it in counterclockwise direction against the action of the spring 222. When a lever 221 is swung into the position shown in dotted lines in Fig. 7 it acts on the first of the contact members 219 and thereby through the construction of the set of contacts on all of the contacts 219 of this particular set. Each lever 221 cooperates with a locking lever 223, which is turnably supported on an axle 224 and is under the influence of a spring 225 tending to move the lever 223 in counterclockwise direction. Therefore, when the switch lever 221 is moved into its operative position its rear end engages a shoulder or notch of the locking lever 223 whereby the lever 221 is prevented from returning into its inoperative position. In other words, after the switch lever 221 is moved into its operative position the set of contacts 219 is held and locked in its operative position. The locking position of the locking lever 223 is shown in dotted lines in Fig. 7.

It should be understood that the selector device can also be operated in such a manner that the lever 216 is pressed down and then moved in pressed down position over a consecutive number of switch levers 221 so that in this manner rapidly a number of consecutive printing portions can be selected for reproduction without any difficulty.

Attached to the main control lever 216 is also a pin member 226 projecting in transverse direction. When the main lever 216 is moved in counterclockwise direction or upwardly, the end of the pin member 226 abuts against the upper end of a locking lever 223 when in its locking position. Thereby the particular locking lever 223 is moved out of its engagement with the associated switch lever 221 so that both these levers return into their inoperative or idle position and the corresponding contact set 219 is also permitted to return into its inoperative position. In this manner any selection of a particular reproduction of a printing portion is by this action cancelled. In this manner any selected printing portion or line can be cancelled individually. However, on a common shaft 227 a series of cancelling levers 228 are mounted so that by turning the cancelling levers 228 by turning the shaft 227 from the outside of the machine against the action of a spring 229, all those locking levers 223 that had been placed in locking position, are moved out of this position so that in this manner all the selected printing portions are cancelled.

Figs. 18–20 illustrate a different embodiment of the selector and indicating device forming part of the machine according to the invention. In this case the selector device includes a series of indicator buttons which are respectively associated with the individual printing portions forming part of the indicator sheet 202, and likewise associated with the corresponding switch means or actuating means for controlling the selected printing operation.

As shown in Fig. 18, the individual buttons marked $T_1$—$T_{27}$ in Fig. 19 and marked with consecutive numerals corresponding to the consecutive numerals of the printing portions of the sheet 202, are arranged alongside the locating edge 204 of the panel 201 with a set of signal lamps 207 also located alongside the locating strip 204 in register both with the indicator buttons and the corresponding portions of the sheet 202. In all those cases where the line spacing between consecutive printing portions of the sheet 202 is comparatively small as for instance 8.5 or 12.75 mm. in all those cases it is recommendable to arrange the consecutive indicator buttons also offset in transverse direction against each other so that they can still be in register with the consecutive printing portions of the sheet 202.

Each one of the indicator buttons is associated with and operatively connected to a corresponding set of switch contacts $S_1$–$S_{27}$. When any one of the indicator buttons is manually pushed down in direction of arrow K whereby a spring 236 is compressed then a sliding bar 236′ and a pivotally connected locking lever 238 are moved down and a pin 237 mounted in the locking lever 238 slides along a track 239 of a locking member 240 until this pin 237 reaches the lowest point of the track 239. When the pin 237 abuts there the pressure of a finger on that particular button temporarily gives so that the spring 236 tends to move temporarily the button in direction opposite to the arrow K. In this instant, the spring 241 swings the locking lever 238 around its pivot 242 in direction of arrow L until the pin 237 is stopped and held in the track at the point marked 243. In this position the indicator button and the attached actuating means are locked in position. During the movement of the button in direction of arrow K a part of the just-mentioned structure has moved the switch members, i.e. the contacts into operative position with the result that these switches or this particular switch is now also locked in operative position.

If one of the selected printing portions is to be cancelled, in other words if the corresponding switch means are to be released out of their locked position, then the particular indicator button is to be pushed in downward direction for a short period and then released. Under the second operation of the button the pin 237 continues to travel in the track 239 while being still under the action of the spring 241. The pin 237 reaches the second lowest point of the track 239 whereafter it will move upward back to its original position while the button under the action of the associated spring 236 returns in upward direction to its idle position. The portion of the track for the return of the indicator button and of the associated pin 237 is closed at its bottom. Therefore the pin 237 can only return at its uppermost point into the track 239 so that it is always moved into the correct portion of the track when the indicator button is operated.

If all the indicator buttons are to be brought back into normal position, which means that all the selected printing portions are to be cancelled, then a shaft 247 which is turnably mounted in the end wall 246 of the panel 201 is to be turned by means of the knob 248. When this shaft 247 is turned then the cancelling arms 249 are turned so that they pull with their tips 250 the locking levers 238 together with their guide pins 237 out of their engagement with the track portions 239 and 243, respectively. Then the springs 236 force the indicator buttons back into their idle position while the corresponding pin 237 is forced by the spring 241 against the member 240 and therefore snaps at its upper position back into the track portion 239. A spring 251 always returns the shaft 247 with its attached extensions 250 into its idle or inoperative position.

Having thus just described the general structure and function of the selector and indicator means, the following will serve to explain the action of the selector and indicator device on the entire rotary duplicator machine as provided by the present invention.

Referring to Figs. 1–5, the operation of the illustrated duplicating machine is as follows. After the indicator sheet 202 has been placed and clamped on the panel 201, and after, if selective printing is desired, the above-described selector means have been operated, the machine is ready for operation. A copy sheet 21 is fed towards the feed rollers 22, 23. The roller 23 is rotated by some drive means, for instance a gear 24, so that the copy sheet 21 is moved to the pressure line A—B between the printing roller 1 and the counter roller 10. For the purpose of selectively printing printing form portions or lines from the printing form 2 attached to the rotating printing roller 1, a movement to and from the printing roller 1 is imparted to the counter roller 10 by electromagnetic means which have been previously set for proper actuation in accordance with the selection by means of setting the movable control member 212 in the above-described selector means. The movement of the counter roller 10 towards the printing roller 1 is effected by the electromagnets 28 which are energized depending upon how previously the contacts $EK_1$—$EK_{10}$ and $EK_{101}$—$EK_{110}$ have been prepared for operation by the setting of the selector means 212 and 216.

The counter roller 10 is moved away from the printing roller 1 after the electromagnets 28 are deenergized, by the action of springs 29.

A main control shaft 34 is driven in synchronism with the printing roller 1 by a gear train 31, 32, 33. The main control shaft 34 carries a contact lever 35 (control device I) and operates during its rotation synchronously with the printing roller 1 the associated contacts $K_1$—$K_{10}$ so as to close successively every one of the contacts. The contacts $K_1$—$K_{10}$ are part of the circuit which contains the electromagnets 28. However, in the same circuit are located also the contacts $EK_1$—$EK_{10}$ which can be moved into closed position and held in this position by means of the movable control member 212 and lever 216, as has been explained in reference to Figs. 6–8.

A one-turn clutch 52—55 is arranged on an intermediate shaft 51 forming part of the continuously operated drive of the machine. This clutch is caused to engage shortly before the completion of a full rotation of the printing roller 1 by means of a control lever 57 which tilts about a pivot 59 and is controlled by a cam disc 56 of the printing drum 1 and a roller 58 following the outside contour of the cam 56. The clutch 52—55 serves to drive the feed rollers 22, 23 via a set of sprocket wheels 44, 45 and a chain 46 and at the same time keeps the counter roller 10 rotating while this roller is moved away from the printing roller 1. By these means, in a process of intermittent printing, that portion of the copy sheet which has not been printed is moved through or across the pressure line A—B whereafter the copy sheet 21 is ejected from the machine.

However, the one-turn clutch 52—55 is also connected with another contact arm 60 (control device III) which after completion of one revolution of the printing roller 1 passes over the associated set of contacts $K_{201}$—$K_{210}$. Now a relay 61 can be energized by electrical energy which flows over the closed contacts of the control device II, namely $EK_{101}$—$EK_{110}$, and the contacts $K_{201}$—$K_{210}$ that have been passed over by the contact arm 60 (control device III). This relay actuates the switching device 37—43 of the control device II as many times as there are contacts that have been closed by the contact device II. In this manner the contact arm 36 of the control device II has been moved back by as many steps as there are lines or portions of the form the reproduction whereof has been controlled by the control device II.

When the machine is intended to be used not for selective intermittent printing but for reproduction of whole pages or the whole content of a printing form, a second pressure control lever 62 is operated and is then held in a selected position by means of a lever 64 engaging corresponding notches in an arcuate notched member 63. By the turning movement of the lever 64 a second eccentric shaft 65 is moved in such a manner that the toggle levers 16, 17 are moved almost as far as to their completely stretched position whereby the counter roller 10 is pressed against the printing roller 1. The amount of pressure depends upon the degree of turning the lever 64 to one or the other selected positions. This second pressure control has been provided for the only purpose that in case of reproduction of full pages without intermittent or selective printing the solenoids would not be overloaded by continuous energization, or in order to avoid the necessity of giving the solenoids too large a dimension for the reasons stated.

If it is desired to use the above-described rotary duplicating machine for selective printing of printing portions of the form or of individual lines, it is necessary to prepare the circuit for the electromagnets 28 by means of a set of switches I as shown in Fig. 5. This set of switches I comprises the contacts $EK_1$—$EK_{10}$ which are controlled by the selector device 212, 216 and is connected to the general supply of electricity. The control device I comprising the contact arm 35 with its roller 71 rotating with the main control shaft 34, is driven by the printing roller 1 and closes the stationary contacts $K_1$—$K_{10}$ which are reached by the roller 71, and cooperates with the above-mentioned set of contacts $EK_1$—$EK_{10}$, for the purpose of controlling the operation of the electromagnets 28.

If for instance the contacts $EK_1$—$EK_3$ and $EK_7$ of the set I have been closed by actuation of the selector means 212, 216, then all the pertaining circuits have been prepared for the operation, as will be described further below in reference to Figs. 14—16.

If now the printing roller 1 carries out a revolution the contact arm 35 of the control device I is rotated in synchronism therewith and closes successively all the contacts $K_1$—$K_{10}$ during this revolution as is indicated in Fig. 5.

However, the circuits between these contacts and the electromagnets 28 are not all closed but only those circuits are closed in which previously by the operation of the set of switches I also the contacts $EK_1$—$EK_3$ and $EK_7$ have been closed. Therefore, during the rotation of the printing roller 1, only the portions or lines 1—3 and 7 of the printing form 2 are reproduced. There are enough contacts in the control device I as well as in the control devices II and III that any desired number of individual portions or lines of the printing form can be selected and reproduced.

The selected lines or portions, for instance portion or line No. 1, 2, 3 and 7, are printed in consecutive order and with regular line spacing because the machine works by intermittent printing wherein the copy sheet 21 is held stationarily by the holding device 72 while the counter roller 10 is away from the printing roller 1. The same printing operation can be repeated as often as may be desired without the necessity of a new setting of the switches or controls. If however a change of the setting or selection is desired, the cancelling lever 223 may be operated whereby the locking devices of all the contact sets 219 are released and thereby all these contacts are returned to their inoperative position as is illustrated by Fig. 7.

In the embodiment illustrated by Fig. 5 the second set of switches or contacts $EK_{101}$—$EK_{110}$ has also the purpose to be used for presetting the operation of the solenoids 28 and to control their action in the same manner as the contacts of the set I, however in this case the reproduction of such portions or lines is prepared or preset which differ from those that have been reproduced according to the original selection. This means, that if for instance in this second set of contacts the lines 4, 5 and 6 are selected, the rotating printing roller 1 would reproduce in the next revolution the lines 7, 8 and 9. This is arrived at in the following manner.

May it be assumed that in the set of contacts II for instance the contacts $EK_{104}$, $EK_{105}$ and $EK_{106}$ have been actuated and locked in closed position. Conjointly with the rotation of the printing roller 1 also a contact arm 36 (control device II) rotates in synchronism therewith and temporarily closes all associated stationary contacts for instance $K_{101}$—$K_{110}$. However, only those circuits in which the above-mentioned contacts for instance $EK_{104}$, $EK_{105}$ and $EK_{106}$ have been closed, are completed by the operation of the control arm 36 so that the electromagnets 28 are accordingly energized. Therefore in this example the portions or lines 4, 5 and 6 are being printed. Shortly before completion of a revolution of the printing roller 1 the one-turn clutch 52—55 is operated as described with reference to Fig. 1, so that the ejector device 44—46 is set into motion and at the same time the contact lever 60 of the control device III is caused to rotate. Now the electric current travels over the closed contacts for instance $EK_{104}$, $EK_{105}$ and $EK_{106}$ to the stationary contacts $K_{204}$, $K_{205}$, and $K_{206}$ from where it is guided by the contact arm 60 of the control device III and over the sliding contact 74 to the relay 61 for the switching device 37—43. In this manner and under the circumstances of this example, the relay is energized by the contacts $K_{204}$, $K_{205}$ and $K_{206}$, which means three times. Consequently, the contact arm 36 of the control device II is set or moved in the direction opposite to its direction of revolution by an angular amount corresponding to three switching steps. During the next following revolution of the printing roller 1 and during the printing of the next following copy sheet the contact arm 36 of the control device II will therefore meet the preset contacts $K_{104}$, $K_{105}$ and $K_{106}$ somewhat later, actually three steps later, so that the lines or portions 7, 8 and 9 are printed although the contacts $K_{104}$, $K_{105}$ and $K_{106}$ and the contacts of the second set $EK_{104}$, $EK_{105}$, $EK_{106}$ are cooperating with the electromagnets 28. When the contact arm 36 of the control device II is moved backwards, the associated contacts for instance $K_{101}$—$K_{110}$ are not moved into closed position on acount of their special design.

When the cancelling lever 228 of the selector device is operated a magnet 76 is energized at the same time whereby a lever 77 is moved or turned about its pivot 78 against the action of a spring 79. Thereby the pawl 96 of the one-turn clutch 80, 84, 86 and 96 is released and is carried along by the ratchet wheel 80 which is being driven by the permanently rotating intermediate shaft 51 via chain sprockets 81, 82 and a chain 83. The pawl 96 is turnable on pin 84 mounted on the disc 85 and is influenced by a spring 86. The disc 85 is supported loosely on the main control shaft 34 and is maintained in its position by the control lever 77.

During a revolution of the one-turn clutch 80, 84–86 and 96, while the printing roller 1 is standing still, a second pawl 87 engages a pin 88 of the contact lever 36 of the control device II and carries it out of any position along until it arrives in its basic or initial position. There the pawl 87 is lifted by a pin 89 and thereby releases the contact arm 36 of the control device II.

Referring now to Figs. 9 and 10 illustrating a slightly different type of a rotary duplicating machine, the copy sheet 21 is fed towards the printing roller by the feed rollers 22 and 23. The feed rollers 22 and 23 are turned by a set of gears 24 and 100, while the gear 100 is connected by a link 101 with a bell crank lever 102 which turns on a pivot 103 and is held by a spring 105 in contact with a cam 106. A roller 104 rests on this cam contour 106 which during the revolution of the printing roller 1 causes the gear 100 to carry out oscillating movements in accordance with the revolution of the printing roller 1. Either the gear 100 or the gear 24 is connected with a one-direction clutch which transmits to the roller 23 only an intermittent movement in one direction. In this manner a copy sheet 21 is moved stepwise towards the printing or pressure line U—V between the printing roller 1 and the counter roller 10.

A main control shaft 34 is driven by a gear train 31, 32, 33 in synchronism with the printing roller 1. Control elements, for instance roller discs 107 and 108 each being equipped with rollers 109 are mounted for rotation on the shaft 34. The angular spacing between two neighboring rollers 109 on either the roller disc 107 or 108 corresponds to the spacing between two consecutive lines of the printing form 2. The rollers 109 of one roller disc 107 are offset against the rollers 109 of the other roller disc 108 by one line spacing. In case the spacing between consecutive lines or portions of the printing form is larger, then one roller disc for instance 107 is sufficient. On the other hand, it is also possible to provide for a greater number of roller discs so that the spacing can be subdivided even more.

When the roller discs 107 and 108 rotate together with the printing roller 1, at a certain moment one of the rollers 109 leaves the feeler lever 110 or 111. When the magnet 28 or 28a is deenergized, then the coupling member 112 or 113, respectively, is in the position shown in full lines in Fig. 9, in which case the particular roller 109 swings the feeler lever 110 or 111, respectively, in the direction of the arrow about its stationary axle 114 without affecting the other mechanical devices controlling the operation of the pressure roller 10. After the roller 109 has passed the feeler lever 110 or 111, respectively, the spring 115 moves the feeler lever 110 or 111 back towards the stop 116. However, when for instance the magnet 28a is energized the coupling link 112 is moved into the position shown in dotted lines. If now a particular roller 109 meets or engages the feeler lever 110, the coupling link 112 is forced to join the movement of the feeler 110. The coupling link 112 is turnable about a pivot 117 which is mounted in a transfer lever 118. The transfer lever 118 is rigidly connected with the shaft 114 and turns together with the latter. This turning movement is transferred to the bell crank lever 119 which turns about a stationary pivot 26. The opposite end of the bell crank lever 119 is joined with links 120 which are connected to the pivot 18 of the toggle arrangement. If pressure is exerted upon the latter in direction of arrow W, then the pressure roller 10 is moved and turned by means of the brackets 25 about its stationary pivot 26 so that it is pressed against the printing roller 1 whereby the printing operation is carried out. The spring 121 returns the whole actuating mechanism back into the position shown in full lines in the drawing, as soon as the particular roller 109 leaves the engagement with the feeler lever 110.

Also in this case the selective control of the solenoids 28 and 28a is accomplished by means of the selector means 212, 216 and by the sets of contacts 219 as has been described with reference to Figs. 6, 7 and 8.

Also in this embodiment, the control shaft 34 carries a contact arm 35 (control device I), as shown in Figs. 1 and 5, and during a revolution of the shaft 34 in synchronism with the printing roller 1 the contact arm 35 passes over the associated contacts $K_1$—$K_{10}$ so as to move them into closed position. The control of the flow of electric energy to the electromagnets 28 and 28a is done as already described in reference to Figs. 1–5, by means of the control devices I, II, III and by the contact arms 35, 36, 60.

Referring now to Figs. 11, 12 and 13 illustrating still another embodiment of a rotary duplicating machine, again a control shaft 34 is driven by a gear train 31, 32, 33. Mounted on the control shaft 34 are control elements for instance roller discs 151, 152 and 153 with rollers 143 spaced from each other. The angular spacing of the rollers 154 of one roller disc 151 from each other corresponds to three line spacings of the printing form 2. The rollers 154 on each roller disc are offset angularly against the rollers of the other disc by one line spacing. However, a different arrangement with a different number of roller discs is quite as useful and may be chosen for further dividing the spacing. The individual rollers 154 are movable in axial direction within the individual roller discs 151, 152 and 153, respectively, and in the two end positions they are resiliently locked by means of spring supported balls 158.

Individual rollers 154 may be moved in relation to their disc by mechanical or electromagnetical means as will be described later so that the rollers 154 achieve a position in the operational plane of the corresponding feeler lever 155, 156, 157, respectively. When the roller discs 151, 152 and 153 rotate in synchronism with the printing roller 1 those of the rollers 154 which have been previously moved into operative position will meet with the corresponding feeler lever 155, 156, 157, respectively. Thereby the particular feeler lever will be swung about its stationary shaft 114 in direction of arrow X. This movement is transferred to the bell crank lever 119 which rotates about the stationary pivot 26. The other end of the lever 119 is joined to links 120 which are in turn connected to the pivot 18 of the toggle mechanism. If the latter is pushed in direction of arrow Y the counter roller 10 is moved by means of the brackets 25 turning around the shaft 26, towards the printing roller 1 so that the printing operation is carried out. The spring 29 moves the whole actuating mechanism back into the normal position as shown in Fig. 11 as soon as the rollers 154 have separated from the corresponding feeler lever 155, 156, 157, respectively.

The individual rollers 154 are moved by electromagnetic means to and from their operative positions as follows: Two electromagnets 28a and 28b are located on opposite sides of, and associated with, each one of the rollers 154. The electromagnets 28a are electrically connected with the selector means 212, 216. When the printing roller 1, as shown in Fig. 13, is in its normal position the normally open switch $T_{11}$ is held in closed position by a pin 159 carried by the printing roller 1 which pin engages a spring controlled lever 160. If now any contact as for instance K6 is closed by operation of the selector means 216, the associated electromagnet 28a is energized and thereby moves its armature in the direction of arrow Z whereby the associated roller 154 is moved into its operative position which is shown in the upper part of Fig. 13. At the same time the signal lamp 207 associated to the selected line or portion is switched on and, as explained, the magnet 28a associated with that particular line or printing portion has now moved the roller 154 into the operational plane of the cam lever 155. The contact controlling the signal lamp 207 remains locked in closed position in order to make sure that this signal remains on during the operation of the machine, while the contact controlling the electromagnet 28a is opened immediately so that this magnet 28a may return into its inoperative position.

While the printing roller 1 is rotating the contact $T_{11}$ is open so that none of the rollers 154 can be shifted or moved during the movement of the printing device. By operating the normally open cancelling switch $L_1$ the cancelling magnets 28b are energized so that the rollers 154 are moved back into their inoperative position in a direction opposite to the arrow Z after which a different selection of lines or portions to be reproduced can be effected by the selector means 212, 216. For the circuit used as just described for cancelling a certain setting of the rollers 154, a similar switch $T_{12}$ is provided as the above mentioned switch $T_{11}$. The switch $T_{12}$ is kept closed by a lever 162 which is operated by a pin 161 mounted on the printing roller 1. This switch $T_{12}$ is therefore only kept closed as long as the printing roller 1 is in its normal position. Therefore none of the electromagnets 28b can be operated while the printing roller 1 is rotated.

Referring now to Figs. 14–17, which illustrate still another embodiment of a rotary duplicating machine, again a control shaft 34 is driven by a gear train 31, 32 33 and carries a roller disc 108. The roller disc 103 is provided with a number of rollers 170 in such a manner that the spacing of the rollers corresponds to the line spacing of the printing form. A movement of the rollers 170 by electromagnetic means between operative and inoperative positions is carried out as follows:

If for instance by operation of the selector means 212, 216 out of the contact sets $K_1$–$K_{10}$ the contacts $K_4$ and $K_6$ are selected and operated, then circuits including the contact points $K_4$ and $K_6$ mounted in the stationary contact carrier 190 shown in Fig. 16 are closed. At the same time the signal lamp 207 associated to the selected line or portion is switched on. The shaft 34 carries an arm 174 which in turn carries a magnet 175. The current to this magnet is carried to it by way of the contact points $K_1$–$K_{12}$ and via sliding contacts 176, 177, respectively. When the machine has been started for one operational cycle by operation of the lever 182 and by actuation of the clutch 178, 179 then first the shaft 34 is set in motion by the chain drive 180, 180a and 181 in direction of the arrow so that the arm 174 and the magnet 175 are rotated with it while the printing roller 1 and the roller disc 108 are still standing still. A sliding contact 176 attached to the arm 174 passes over the contact tips $K_1$–$K_{12}$ and in passing over these contact tips $K_4$ and $K_6$, in the present example, it transmits from the previously closed contacts $K_4$ and $K_6$ an electrical impulse to the magnet 175 which energizes the latter temporarily. Hereby the rollers 170 movably carried in the roller disc 108 are moved in axial direction and into their operative position where they are resiliently held by spring supported balls 171. The magnet core is pulled back into its normal position by a spring 172.

Before the arm 174 and the magnet 175 have returned to their starting positions, the end of the lever 186 passes the pawl 187 so that the latter engages the ratchet wheel 188. Hereby the printing roller 1 with the printing form 2 attached thereto as well as the roller disc 108 driven in synchronism with the printing roller 1 is set into motion so as to turn in the direction indicated by the arrow. Those rollers 170 which have been moved into their operative positions engage the feeler lever 173 so that the latter is turned about its shaft 114 in the direction of the arrow. This turning movement is transferred to the lever 42, the link 120 and to the toggle mechanisms 16, 17 whereby the counter roller 10 which is held in the bracket 19 is moved into printing position.

The spring 29 moves the toggle mechanisms 16, 17, the link 120, the lever 42 and the feeler lever 173 back into their normal position as shown in Fig. 14. The rollers 170 are returned into their inoperative position by means of a cancelling device 189 which can be operated by hand.

It will be understood that each of the elements described above, or two or more together, may also find a useful application in other types of rotary duplicating machine differing from the types described above.

While the invention has been illustrated and described as embodied in rotary duplicating machine for selective, intermittent printing, it is not intended to be limited to the details shown, since various modifications and structural changes may be made without departing in any way from the spirit of the present invention.

Without further analysis, the foregoing will so fully reveal the gist of the present invention that others can by applying curent knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and causing in said operative position printing of the associated printing portion of said printing form by operation of the printing roller; a series of actuating means respectively associated with said switch means and being spaced from each other in one direction distance equal to the distances between the respective associated printing portions of said printing form; holding means for holding an indicator sheet having a series of indicating portions spaced from each other same distances as said printing portions of said printing form, said holding means being located adjacent said series of actuating means for holding said indicator sheet in a position in which each indicating portion thereof registers with the actuating means associated with the same portion of the printing form; and selector means for selectively actuating said actuating means to operate the respective associated switch means, said selector means including indicator means indicating a selected indicating portion at least while the actuating means associated with the same printing portion as said indicating portion holds the associated switch means in said operative position.

2. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and causing in said operative position printing of the associated printing portion of said printing form by operation of the printing roller; a series of actuating means respectively associated with said switch means and being spaced from each other in one direction distance equal to the distances between the respective associated printing portions of said printing form; holding means for holding an indicator sheet having a series of indicating portions spaced from each other same distances as said printing portions of said printing form, said holding means being located adjacent said series of actuating means for holding said indicator sheet in a position in which each indicating portion thereof registers with the actuating means associated with the same portion of the printing form; and selector means including a series of indicator buttons respectively associated with said actuating means and controlling the same, said indicator buttons being spaced from each other in said one direction distances equal to the distances between the respective indicating portions associated with the same printing portions, and being respectively located adjacent said indicating portions, each of said indicator buttons being movable to an operative position for actuating the associated actuating means and switch means.

3. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and causing in said operative position printing of the associated printing portion of said printing form by operation of the printing roller; a series of actuating means respectively associated with said switch means and being spaced from each other in one direction distances equal to the distances between the respective associated printing portions of said printing form; holding means for holding an indicator sheet having a series of indicating portions spaced from each other same distances as said printing portions of said printing form, said holding means being located adjacent said series of actuating means for holding said indicator sheet in a position in which each indicating portion thereof registers with the actuating means associated with the same portion of the printing form; and selector means including an indicator means and being movable between a plurality of positions in which said indicator means indicate selected indicating portions, said selector means cooperating in each of said positions with one of said actuating means for operating the associated switch means.

4. In a rotary duplicating machine as set forth in claim 2, a series of optical signal means respectively associated with said actuating means and operable between a condition in which said signal means indicate that the associated switch means is in inoperative position, and a condition in which said signal means indicate that the associated switch means is in operative position.

5. In a rotary duplicating machine as set forth in claim 2, a series of electrically operated optical signal means respectively associated with said actuating means and operable by said actuating means between a condition in which said signal means indicate that the associated switch means is in inoperative position, and a condition in which said signal means indicate that the associated switch means is in operative position.

6. In a rotary duplicating machine as set forth in claim 2, a series of electrically operated optical signal means respectively associaated with said switch means and operable by said switch means between a condition in which said signal means indicate that the associated switch means is in inoperative position, and a condition in which said signal means indicate that the associated switch means is in operative position.

7. In a rotary duplicating machine as set forth in claim 2, a series of locking means respectively associated with said actuating means and independently operable between a locking position in which the associated actuating means is locked so as to hold the associated switch means in operative position, and a releasing position in which said associated actuating means is released so as to permit the associated switch means to return into inoperative position.

8. In a rotary duplicating machine as set forth in claim 2, a series of locking means respectively associated with said actuating means and independently operable between a locking position in which the associated actuating means is locked so as to hold the associated switch means in operative position and a releasing position in which said associated actuating means is released so as to permit the associated switch means to return into inoperative position, and clearing means operable between an idle position and an operative position in which all those actuating means that have been locked by said locking means are released so as to permit the associated switch means to return to their inoperative position.

9. In a rotary duplicating machine as set forth in claim 2, a series of locking means respectively associated with said actuating means and independently operable between a locking position in which the associated actuating means is locked so as to hold the associated switch means in operative position, and a releasing position in which said associated actuating means is released so as to permit the associated switch means to return into inoperative position, said locking means being respectively moved into locking position by the associated indicator button when the latter is moved to said operative position, and said locking means being moved to releasing position when said indicator button is moved a second time in the direction toward said operative position thereof.

10. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and causing in said operative position printing of the associated printing portion of said printing form by operation of the printing roller; a series of actuating means respectively associated with said switch means and being spaced from each other in one direction distances equal to the distances between the respective associated printing portions of said printing form; holding means for holding an indicator sheet having a series of indicating portions spaced from each other same distances as said printing portions of said printing form, said holding means being located adjacent said series of actuating means for holding said indicator sheet in a position in which each indicating portion thereof registers with the actuating means associated with the same portion of the printing form; and selector means including a series of indicator buttons respectively associated with said actuating means and controlling the same, said indicator buttons being spaced from each other in said one direction distances equal to the distances between the respective indicating portions associated with the same printing portions, and being respectively located adjacent said indicating portions and alternatingly offset against each other in transverse direction so as to form two separate rows along said series of indicating portions, each of said indicator buttons being movable to an operative position for actuating the associated actuating means and switch means.

11. In a rotary duplicating machine including a printing roller adapted to carry a printing form having a series of printing forms, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and effecting in said operative position printing of the associated printing portion of said printing form by operation of the printing roller; a series of actuating means respectively associated with said switch means and being spaced from each other in one direction distances equal to the distances between the respective associated printing portions of said printing form; selector means movable between a plurality of positions respectively associated with said printing portions, said selector means including a movable control member cooperating in each of said positions with one of said actuating means for operating the associated switch means; and a series of locking means respectively associated with said actuating means and independently movable by said actuating means to a position, and movable by said movable control member into as to hold the associated switch means in operative position, and movably by said movable control member into a position in which said associated actuating means are released so as to permit the associated switch means to return to inoperative position.

12. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and effecting in said operative position printing of the associated printing portion of said printing form by operation of the printing roller; a series of actuating means respectively associated with said switch means and being spaced from each other in one direction distances equal to the distances between the respective associated printing portions of said printing form; selector means movable between a plurality of positions respectively associated with said printing portions, said selector means including a movable control member cooperating in each of said positions with one of said actuating means for operating the associated switch means; a series of locking means respectively associated with said actuating means and independently movable by said actuating means to a position in which the associated actuating means is locked so as to hold the associated switch means in operative position, and movable by said movable control member into a position in which said associated actuating means are released so as to permit the associated switch means to return to inoperative position, and clearing means operable between an idle position and an operative position in which all those actuating means that have been locked by said locking means are released so as to permit the associated switch means to return to their inoperative position.

13. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and causing in said operative position printing of the associated printing portion of said printing form by operation of the printing roller; a series of actuating means respectively associated with said switch means and being spaced from each other in one direction distances equal to the distances between the respective associated printing portions of said printing form; holding means for holding an indicator sheet having a series of indicating portions spaced from each other same distances as said printing portions of said printing form, said holding means being located adjacent said series of actuating means for holding said indicator sheet in a position in which each indicating portion thereof registers with the actuating means associated with the same portion of the printing form; and selector means including an indicator means and being movable between a plurality of positions in which said indicator means indicate selected indicating portions, said selector means including a movable control member cooperating in each of said positions with one of said actuating means for operating the associated switch means.

14. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and causing in said operative position printing of the associated printing portion of said printing form by operation of the printing roller; a series of actuating means respectively associated with said switch means and being spaced from each other in one direction distances equal to the distances between the respective associated printing portions of said printing form; holding means for holding an indicator sheet having a series of indicating portions spaced from each other same distances as said printing portions of said printing form, said holding means being located adjacent said series of actuating means for holding said indicator sheet in a position in which each indicating portion thereof registers with the actuating means associated with the same portion of the printing form; selector means including an indicator means and being movable between a plurality of positions in which said indicator means indicate selected indicating portions, said selector means including a movable control member cooperating in each of said positions with one of said actuating means for operating the associated switch means; and a series of locking means respectively associated with said actuating means and independently movable by said actuating means to a position in which the associated actuating means is locked so as to hold the associated switch means in operative position, and movable by said movable control member into a position in which said associated actuating means are released so as to permit the associated switch means to return to inoperative position.

15. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and causing in said operative position printing of the associated printing portion of said printing form by operation of the printing roller; a series of actuating means respectively associated with said switch means and being spaced from each other in one direction distances equal to the distances between the respective associated printing portions of said printing form; holding means for holding an indicator sheet having a series of indicating portions spaced from each other same distances as said printing portions of said printing form, said holding means being located adjacent said series of actuating means for holding said indicator sheet in a position in which each indicating portion thereof registers with the actuating means associated with the same portion of the printing form; selector means including an indicator means and being movable between a plurality of positions in which said indicator means indicate selected indicating portions, said selector means including a movable control member cooperating in each of said positions with one of said actuating means for operating the associated switch means; and a series of locking means respectively associated with said actuating means and independently movable by said actuating means to a position in which the associated actuating means is locked so as to hold the associated switch means in operative position, and movable by said movable control member into a position in which said associated actuating means are released so as to permit the associated switch means to return to inoperative position, clearing means operable between an idle position and an operative position in which all those actuating means that have been locked by said locking means are released so as to permit the associated switch means to return to their inoperative position.

16. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and causing in said operative position printing of the associated printing portion of said printing form by operation of the printing roller; a series of actuating means respectively associated with said switch means and being spaced from each other in one direction distances equal to the distances between the respective associated printing portions of said printing form; a series of optical signal means respectively associated with said actuating means and operable between a condition in which said signal means indicate that the associated switch means is in inoperative position, and a condition in which said switch means indicate that the associated switch means is in operative position; holding means for holding an indicator sheet having a series of indicating portions spaced from each other same distances as said printing portions of said printing form, said holding means being located adjacent said series of actuating means for holding said indicator sheet in a position in which each indicating portion thereof registers with the actuating means associated with the same portion of the printing form; and selector means including an indicator means and being movable between a plurality of positions in which said indicator means indicate selected indicating portions, said selector means cooperating in each of said positions with one of said actuating means for operating the associated switch means.

17. In a rotary duplicating machine as set forth in claim 16, a series of optical signal means operated electrically and operable by said actuating means.

18. In a rotary duplicating machine as set forth in claim 16, a series of optical signal means operated electrically and respectively associated with said switch means and operable by said switch means.

19. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and causing in said operative position printing of the associated printing portion of said printing form by operation of the printing roller; a series of actuating means respectively associated with said switch means and being spaced from each other in one direction distances equal to the distances between the respective associated printing portions of said printing form; holding means for holding an indicator sheet having a series of indicating portions spaced from each other same distances as said printing portions of said printing form, said holding means being located adjacent said series of actuating means for holding said indicator sheet in a position in which each indicating portion thereof registers with the actuating means associated with the same portion of the printing form; selector means for selectively actuating said actuating means to operate the respective associated switch means, said selector means including indicator means indicating a selected indicating portion at least while the actuating means associated with the same printing portion as said indicating portion holds the associated switch means in said operative position; and electrical circuit means connected to said electrical means and said switch means, and including electric control means connected to and controlled by said printing roller for opening and closing said circuit means, said switch means respectively preparing when in operative position a selected circuit and said electric control means when actuated completing said selected circuit for actuating said electrical means in timed relation to the rotation of said printing roller, whereby the selected printed portions of said printing form are printed during a revolution of said printing roller.

20. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and causing in said operative position printing of the associated printing portion of said printing form by operation of the printing roller; a series of actuating means respectively associated with said switch means and being spaced from each other in one direction distances equal to the distances between the respective associated printing portions of said printing form; holding means for holding an indicator sheet having a series of indicating portions spaced from each other same distances as said printing portions of said printing form, said holding means being located adjacent said series of actuating means for holding said indicator sheet in a position in which each indicating portion thereof registers with the actuating means associated with the same portion of the printing form; selector means including a series of indicator buttons respectively associated with said actuating means and controlling the same, said indicator buttons being spaced from each other in said one direction distances equal to the distances between the respective indicating portions associated with the same printing portions, and being respectively located adjacent said indicating portions, each of said indicator buttons being movable to an operative position for actuating the associated actuating means and switch means; and electrical circuit means connected to said electrical means and said switch means, and including electric control means connected to and controlled by said printing roller for opening and closing said circuit means, said switch means respectively preparing when in operative position a selected circuit and said electric control means when actuated completing said selected circuit for actuating said electrical means in timed relation to the rotation of said printing roller, whereby the selected printed portions of said printing form are printed during a revolution of said printing roller.

21. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and causing in said operative position printing of the associated printing portion of said printing form by operation of the printing roller; a series of actuating means respectively associated with said switch means and being spaced from each other in one direction distances equal to the distances between the respective associated printing portions of said printing form; holding means for holding an indicator sheet having a series of indicating portions spaced from each other same distances as said printing portions of said printing form, said holding means being located adjacent said series of actuating means for holding said indicator sheet in a position in which each indicating portion thereof registers with the actuating means associated with the same portion of the printing form; selector means including an indicator means and being movable between a plurality of positions in which said indicator means indicate selected indicating portions, said selector means cooperating in each of said positions with one of said actuating means for operating the associated switch means; and electrical circuit means connected to said electrical means and said switch means, and including electric control means connected to and controlled by said printing roller for opening and closing said circuit means, said switch means respectively preparing when in operative position a selected circuit and said electric control means when actuated completing said selected circuit for actuating said electrical means in timed relation to the rotation of said printing roller, whereby the selected printed portions of said printing form are printed during a revolution of said printing roller.

22. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and effecting in said operative position printing of the associated printing portion of said printing form by operation of the printing roller; a series of actuating means respectively associated with said switch means and being spaced from each other in one direction distances equal to the distances between the respective associated printing portions of said printing form; selector means movable between a plurality of positions respectively associated with said printing portions, said selector means cooperating in each of said positions with one of said actuating means for operating the associated switch means; and electrical circuit means connected to said electrical means and said switch means, and including electric control means connected to and controlled by said printing roller for opening and closing said circuit means, said switch means respectively preparing when in operative position a selected circuit and said electric control means when actuated completing said selected circuit for actuating said electrical means in timed relation to the rotation of said printing roller, whereby the selected printed portions of said printing form are printed during a revolution of said printing roller.

23. In a rotary duplicating machine as set forth in claim 19, a single set of electrical means for moving said counter roller and connected to said respectively associated switch means for being operated by the same, and a single selector means for selectively actuating said switch means and said electrical means at a predetermined moment during a revolution of said printing roller.

24. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of contact sets respectively associated with said printing portion of said printing form nad being connected to said electrical means for actuating the same, each of said contact sets being independently movable to an operative position and effecting in said operative position printing of the associated printing portion of said printing form by operation of the printing roller; a series of actuating levers respectively associated with said contact sets and movable between an inoperative position and an operative position in which one portion of one of said levers engages the associated contact set so as to move the latter to an operative position; selector means movable between a plurality of positions respectively associated with said printing portions, said selector means including a movable control member movable along said series of actuating levers and carrying a movable actuating member movable in one direction for moving selected actuating levers to operative position when said actuating member is operated while said selector means are in a position associated with the respective lever; and electrical circuit means connected to said electrical means and said contact sets, and including electric control means connected to and controlled by said printing roller for opening and closing said circuit means, said contact sets respectively preparing when in operative position a selected circuit and said electric control means when actuated completing said selected circuit for actuating said electrical means in timed relation to the rotation of said printing roller, whereby the selected printed portions of said printing form are printed during a revolution of said printing roller.

25. In a rotary duplicting machine as set forth in claim 24, a series of locking levers respectively associated with said actuating levers, and spring means for holding said actuating and locking levers in mutual engagement in such a manner that when one of said actuating levers is moved to said operative position, the associated locking lever moves into locking position and is held in this position by said spring means.

26. In a rotary duplicating machine as set forth in claim 24, a series of locking levers respectively associated with said actuating levers, and spring means for holding said actuating and locking levers in mutual engagement in such a manner that when one of said actuating levers is moved to said operative position, the associated locking lever moves into locking position and is held in this position by said spring means; and a series of releasing members respectively carried by said actuating members and controlled by said actuating member to engage said locking lever for moving the latter against the action of said spring means temporarily out of engagement with said associated actuating lever whereby the latter is released and said associated contact set is permitted to return to its inoperative position.

27. In a rotary duplicating machine as set forth in claim 24, a series of locking levers respectively associated with said actuating levers, and spring means for holding said actuating and locking levers in mutual engagement in such a manner that when one of said actuating levers is moved to said operative position, the associated locking lever moves into locking position and is held in this position by said spring means; a series of releasing members respectively carried by said actuating members and controlled by said actuating member to engage said locking lever for moving the latter against the action of said spring means temporarily out of engagement with said associated actuating lever whereby the latter is released and said associated contact set is permitted to return to its inoperative position; and a common clearing means associated with said series of actuating levers and locking levers, said clearing means comprising a movable release member movable between an idle position and a releasing position in which it moves against the action of said spring means those of said locking levers which are in locking position temporarily out of engagement with the associated actuating levers whereby the latter are released and the associated contact sets are permitted to return to their inoperative position.

28. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of contact sets respectively associated with said printing portion of said printing form and being connected to said electrical means for actuating the same, each of said contact sets being independently movable to an operative position and effecting in said operative position printing of the associated printing portion of said printing form by operation of the printing roller; a series of actuating levers respectively associated with said contact sets and being spaced from each other in one direction distances equal to the distances between the respective associated printing portions of said printing form, said actuating levers being movable between an inoperative position and an operative position in which one portion of one of said levers engages the associated contact set so as to move the latter to an operative position; holding means for holding an indicator sheet having a series of indicating portions spaced from each other same distances as said printing portions of said printing form, said holding means being located adjacent said series of actuating levers for holding said indicator sheet in a position in which each indicating portion thereof registers with the actuating lever associated with the same portion of the printing form; selector means movable between a plurality of positions respectively associated with said printing portions, said selector means including a movable control member and an indicator means attached to said movable control member, said movable control member being movable along said series of actuating levers and carrying a movable actuating member movable in one direction for moving selected actuating levers to operative position when said actuating member is operated while said selector means are in a position associated with the respective lever and in which said indicator means indicate selected indicating portions; and electrical circuit means connected to said electrical means and said contact sets, and including electric control means connected to and controlled by said printing roller for opening and closing said circuit means, said contact sets respectively preparing when in operative position a selected circuit and said electric control means when actuated completing said selected circuit for actuating said electrical means in timed relation to the rotation of said printing roller, whereby the selected printed portions of said printing form are printed during a revolution of said printing roller.

29. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of contact sets respectively associated with said printing portions of said printing form and being connected to said electrical means for actuating the same, each of said contact sets being independently movable to and operative position and effecting in said operative position printing of the associated printing portion of said printing form by operation of the printing roller; a series of actuating means respectively associated with said contact sets, each of said actuating means including a sliding bar movable between an inoperative position and an operative position, spring means tending to return said sliding bars to their inoperative position, each of said sliding bars engaging in its operative position an associated contact set so as to move it to its operative position; selector means including a series of indicator buttons for respectively moving said sliding bars and movable between an inoperative position and an operative position in which the respective associated sliding bar is moved to its operative position; and electrical circuit means connected to said electrical means and said contact sets, and including electric control means connected to and controlled by said printing roller for opening and closing said circuit means, said contact sets respectively preparing when in operative position a selected circuit and said electric control means when actuated completing said selected circuit for actuating said electrical means in timed relation to the rotation of said printing roller, whereby the selected printed portions of said printing form are printed during a revolution of said printing roller.

30. In a rotary duplicating machine as set forth in claim 29, a series of locking means respectively associated with said sliding bars for holding the associated sliding bar in its operative position, each of said locking means including a turnable locking lever carried by the respective sliding bar and a locking spring tending to turn said locking lever in one direction, and a stationary locking plate, said locking plate having a continuous track and said locking lever having a pin projecting into said track, said track having consecutive portions extending at angles to each other so that when one of said sliding bars is moved to its operative position said pin moves along one portion of said track and upon reaching the end of said portion it moves under the action of said locking spring along the next portion at the end of which said pin is held under the action of said spring means and said locking spring whereby said sliding bar is locked and the associated contact set is held in its operative position, while repeated movement of said sliding bar in the same direction causes said pin to move under the action of said locking spring along the next portion of said track out of its locked position so that after subsequent release of said indicator button said sliding bar returns under the action of said spring means to its inoperative position while said pin moves along the next portion of said track to its starting point and the associated contact set is permitted to return to its inoperative position.

31. In a rotary duplicating machine as set forth in claim 29, a series of locking means respectively associated with said sliding bars for holding the associated sliding bar in its operative position, each of said locking means including a turnable locking lever carried by the respective sliding bar and a locking spring tending to turn said locking lever in one direction, and a stationary locking plate, said locking plate having a continuous track and said locking lever having a pin projecting into said track, said track having consecutive portions extending at angles to each other so that when one of said sliding bars is moved to its operative position said pin moves along one portion of said track and upon reaching the end of said portion it moves under the action of said locking spring along the next portion at the end of which said pin is held under the action of said spring means and said locking spring whereby said sliding bar is locked and the associated contact set is held in its operative position, while repeated movement of said sliding bar in the same direction causes said pin to move under the action of said locking spring along the next portion of said track out of its locked position so that after subsequent release of said indicator button said sliding bar returns under the action of said spring means to its inoperative position while said pin moves along the next portion of said track to its starting point and the associated contact set is permitted to return to its inoperative position; and common clearing means associated with said series of actuating means and locking means said clearing means comprising a movable release member movable between an idle position and an operative position in which it moves against the action of said locker spring those of said locking levers which are in locking position in such a manner that the pins of said locking levers are disengaged from said tracks so that the associated slide bars under the action of said spring means are returned to their inoperative position and the associated contact sets are permitted to move to their inoperative position.

32. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of contact sets respectively associated with said printing portions of said printing form and being connected to said electrical means for actuating the same, each of said contact sets being independently movable to an operative position and effecting in said operative position printing of the associated printing portion of said printing form by operation of the printing roller; a series of actuating means respectively associated with said contact sets, each of said actuating means including a sliding bar said sliding bar being spaced from each other in one direction distances equal to the distances between the respective associated printing portions of said printing form, said sliding bars being movable between an inoperative position and an operative position, spring means tending to return said sliding bars to their inoperative position, each of said sliding bars engaging in its operative position an associated contact set as to move it to its operative position; holding means for holding an indicator sheet having a series of indicating portions spaced from each other same distances as said printing portions of said printing form, said holding means being located adjacent said series of sliding bars for holding said indicator sheet in a position in which each indicating portion thereof registers with the sliding bar associated with the same portion of the printing form; selector means including a series of indicator buttons indicating selected indicated portions and for respectively moving said sliding bars and movable between an inoperative position and an operative position in which the respective associated sliding bar is moved to its operative position; and electrical circuit means connected to said electrical means and said contact sets, and including electric control means connected to and controlled by said printing roller for opening and closing said circuit means, said contact sets respectively preparing when in operative position a selected circuit and said electric control means when actuated completing said selected circuit for actuating said electrical means in timed relation to the rotation of said printing roller, whereby the selected printed portions of said printing form are printed during a revolution of said printing roller.

33. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and effecting in said operative position printing of the associated printing portion of said printing form by operation of the printing roller; a series of actuating means respectively associated with said switch means and being spaced from each other in one direction distances equal to the distances between the respective associated printing portions of said printing form; selector means movable between a plurality of positions respetcively associated with said printing portions, said selector means cooperating in each of said positions with one of said actuating means for operating the associated switch means; and a series of locking means respectively associated with said actuating means and independently operable between a position in which the associated actuating means is locked so as to hold the associated switch means in operative position, and a position in which said associated actuating means are released so as to permit the associated switch means to return into inoperative position.

34. In a rotary duplicating machine including a printing roller adapted to carry a printing form having a series of printing portions, and a counter roller movable to and from a printing position in close proximity to said printing roller, in combination, moving means for moving said counter roller to and from said printing position for printing the printing portions of said printing form and including electrical means; a series of switch means respectively associated with said printing portions of said printing form and being connected to said electrical means for actuating the same, each of said switch means being independently movable to an operative position and effecting in said operative position printing of the associated printing portion of said printing form by operation of the printing roller; a series of actuating means respectively associated with said switch means and being spaced from each other in one direction distances equal to the distances between the respective associated printing portions of said printing form; selector means movable between a plurality of positions respectively associated with said printing portions, said selector means cooperating in each of said positions with one of said actuating means for operating the associated switch means; a series of locking means respectively associated with said actuating means and independently operable between a position in which the associated actuating means is locked so as to hold the associated switch means in operative position, and a position in which said associated actuating means are released so as to permit the associated switch means to return into inoperative position; and clearing means operable between an idle position and an operative position in which all those actuating means that have been locked by said locking means are released so as to permit the associated switch means to return to their inoperative position.

References Cited in the file of this patent

UNITED STATES PATENTS 2,787,212  Delplanque _____ Apr. 2, 1957